(12) United States Patent
Oikawa et al.

(10) Patent No.: US 10,208,726 B2
(45) Date of Patent: Feb. 19, 2019

(54) FUEL INJECTION DEVICE

(71) Applicant: DENSO CORPORATION, Kariya, Aichi-pref. (JP)

(72) Inventors: Shinobu Oikawa, Kariya (JP); Eiji Mimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/580,032

(22) PCT Filed: May 12, 2016

(86) PCT No.: PCT/JP2016/002330
§ 371 (c)(1),
(2) Date: Dec. 6, 2017

(87) PCT Pub. No.: WO2016/199347
PCT Pub. Date: Dec. 15, 2016

(65) Prior Publication Data
US 2018/0142656 A1 May 24, 2018

(30) Foreign Application Priority Data
Jun. 10, 2015 (JP) .................................. 2015-117471

(51) Int. Cl.
*F02M 61/18* (2006.01)
*F02M 51/06* (2006.01)
(Continued)

(52) U.S. Cl.
CPC ............ *F02M 61/18* (2013.01); *F02M 51/06* (2013.01); *F02M 51/0614* (2013.01);
(Continued)

(58) Field of Classification Search
CPC .... F02M 61/18; F02M 61/10; F02M 51/0625; F02M 51/0614; F02M 51/0653; F02M 51/0678
(Continued)

(56) References Cited

U.S. PATENT DOCUMENTS 5,762,272 A * 6/1998 Tani .................... F02M 51/0678
239/543
6,102,302 A * 8/2000 Nishimura ........... F02M 47/027
239/124
(Continued)

FOREIGN PATENT DOCUMENTS

| JP | 11-6467 | 1/1999 |
|---|---|---|
| JP | 2000-170620 | 6/2000 |

(Continued)

*Primary Examiner* — Hai Huynh
(74) *Attorney, Agent, or Firm* — Nixon & Vanderhye P.C.

(57) ABSTRACT

An inside projection is formed in one piece with a second tubular member and projects in a tubular form toward a third tubular member, and an outside projection is formed in one piece with the third tubular member and projects in a tubular form toward the second tubular member, while an inner wall of the outside projection is engaged with an outer wall of the inside projection. Another inside projection is formed in one piece with the second tubular member and projects in a tubular form toward a first tubular member, and another outside projection is formed in one piece with the first tubular member and projects in a tubular form toward the second tubular member, while an inner wall of the outside projection is engaged with an outer wall of the inside projection.

12 Claims, 11 Drawing Sheets

(51) Int. Cl.
  *F02M 61/16* (2006.01)
  *F16K 31/06* (2006.01)
  *H01F 7/121* (2006.01)
  *F02M 61/10* (2006.01)
  *F02M 61/12* (2006.01)
  *H01F 7/16* (2006.01)

(52) U.S. Cl.
  CPC .... *F02M 51/0625* (2013.01); *F02M 51/0682* (2013.01); *F02M 61/10* (2013.01); *F02M 61/12* (2013.01); *F02M 61/16* (2013.01); *F16K 31/06* (2013.01); *H01F 7/121* (2013.01); *H01F 7/1607* (2013.01)

(58) Field of Classification Search
  USPC ............................ 123/470, 490; 239/585.5
  See application file for complete search history.

(56) References Cited

U.S. PATENT DOCUMENTS

| | | | |
|---|---|---|---|
| 6,367,721 B1 | 4/2002 | Ikeya et al. | |
| 6,439,484 B2* | 8/2002 | Harata | F02M 51/0614 239/552 |
| 6,616,072 B2* | 9/2003 | Harata | F02M 51/0678 239/533.12 |
| 7,159,802 B2* | 1/2007 | Oomura | F02M 61/1846 239/533.12 |
| 7,472,838 B2* | 1/2009 | Omura | F02M 61/1853 239/533.12 |
| 7,866,577 B2* | 1/2011 | Yoshimaru | F02M 51/0682 239/533.12 |
| 8,287,007 B2* | 10/2012 | Reiter | F02M 51/0682 285/239 |
| 8,684,285 B2* | 4/2014 | Imai | F02M 51/0671 239/533.14 |
| 9,309,851 B2* | 4/2016 | Oomura | F02M 61/1806 |
| 9,605,634 B2* | 3/2017 | Yoshimaru | F02M 51/0614 |
| 9,709,010 B2* | 7/2017 | Kato | F02M 51/06 |
| 2011/0078890 A1 | 4/2011 | Bormann et al. | |
| 2012/0080542 A1 | 4/2012 | Imai | |
| 2016/0097358 A1 | 4/2016 | Miyake et al. | |
| 2016/0252064 A1* | 9/2016 | Filippi | F02M 63/0007 123/478 |

FOREIGN PATENT DOCUMENTS

| | | |
|---|---|---|
| JP | 2008-157035 | 7/2008 |
| JP | 2013-217307 | 10/2013 |

* cited by examiner

VALVE OPENING DIRECTION
STATIONARY CORE SIDE

VALVE CLOSING DIRECTION
VALVE SEAT SIDE

FUEL INJECTION DEVICE

CROSS REFERENCE TO RELATED APPLICATION

This application is the U.S. national phase of International Application No. PCT/JP2016/002330 filed on May 12, 2016 and is based on and incorporates herein by reference Japanese Patent Application No. 2015-117471 filed on Jun. 10, 2015.

TECHNICAL FIELD

The present disclosure relates to a fuel injection device that injects fuel at an internal combustion engine.

BACKGROUND ART

Previously, there is known a fuel injection device that can inject high pressure liquid fuel. For example, in a fuel injection device disclosed in the patent literature 1, three tubular members are coaxially arranged one after another and are joined together by welding to form a housing. A fuel passage, which conducts the fuel to be injected, is formed in an inside of the housing.

In the fuel injection device of the patent literature 1, among the three tubular members, which form the housing, two tubular members, which are located at two ends, respectively, of the housing, are made of a magnetic material, and an intermediate tubular member, which is interposed between the two tubular members, is made of a non-magnetic material. A coil is placed on a radially outer side of the intermediate tubular member and a stationary core. With this construction, when the coil is energized, a movable core can be magnetically attracted to the stationary core.

In the fuel injection device of the patent literature 1, when a pressure of the fuel in the fuel passage is increased to a predetermined value or higher, the housing may possibly be deformed in a radial direction. Particularly, when an area around any one of connecting portions, at which the three tubular members are respectively joined, is deformed in the radial direction, a stress may be concentrated at this connecting portion to possibly cause fracturing of the welded portion and generation of a gap between the tubular members. When the gap is formed between the tubular members, the fuel in the fuel passage may possibly leak to an outside of the housing.

CITATION LIST

Patent Literature

PATENT LITERATURE 1: JP2013-217307A

SUMMARY OF INVENTION

The present disclosure is made in view of the above point, and it is an objective of the present disclosure to provide a fuel injection device that can inject high pressure fuel while limiting leakage of the fuel from a fuel passage to an outside of a housing.

A fuel injection device of the present disclosure includes a nozzle, a housing, a needle, an inside projection and an outside projection.

The nozzle includes a nozzle tube portion, a nozzle bottom portion, an injection hole and a valve seat.

The nozzle tube portion is shaped into a tubular form. The nozzle bottom portion closes one end of the nozzle tube portion. The injection hole connects between a surface of the nozzle bottom portion, which is located on the nozzle tube portion side, and an opposite surface of the nozzle bottom portion, which is opposite from the nozzle tube portion, and the injection hole injects fuel. The valve seat is formed into a ring form around the injection hole on the nozzle tube portion side of the nozzle bottom portion.

The housing includes a first tubular member, a second tubular member, a third tubular member and a fuel passage.

The first tubular member is placed such that one end of the first tubular member is connected to an opposite side of the nozzle tube portion, which is opposite from the nozzle bottom portion.

The second tubular member is placed such that one end of the second tubular member is placed at a side where another end of the first tubular member is located.

The third tubular member is placed such that one end of the third tubular member is placed at a side where another end of the second tubular member is located.

The fuel passage is formed in an inside of the first tubular member, the second tubular member and the third tubular member to conduct the fuel to the injection hole.

The needle is reciprocatable in an inside of the fuel passage. When one end of the needle is lifted away from or is seated against the valve seat, the needle opens or closes the injection hole.

The inside projection is formed in one piece with one of the second tubular member and the third tubular member such that the inside projection projects in a tubular form from an end surface of the one of the second tubular member and the third tubular member toward another one of the second tubular member and the third tubular member and is connected to the another one of the second tubular member and the third tubular member.

The outside projection is formed in one piece with the another one of the second tubular member and the third tubular member such that the outside projection projects in a tubular form from an end surface of the another one of the second tubular member and the third tubular member toward the one of the second tubular member and the third tubular member and is connected to the one of the second tubular member and the third tubular member while an inner wall of the outside projection contacts an outer wall of the inside projection.

In the present disclosure, the outside projection, which is formed in one piece with the another one of the second tubular member and the third tubular member, is placed on the radially outer side of the inside projection, which is formed in one piece with the one of the second tubular member and the third tubular member while the outer wall of the inside projection contacts the inner wall of the outside projection. Therefore, even when the pressure of the fuel, which is present in the fuel passage, is increased, it is possible to limit radial deformation of the inside projection. Thereby, it is possible to limit concentration of a stress at the connecting portion, at which the inside projection is connected to the another one of the second tubular member and the third tubular member, and the connection at which the outside projection is connected to the one of the second tubular member and the third tubular member. As a result, it is possible to limit fracturing of the above connecting portions and generation of a gap at the above connecting portions. Therefore, it is possible to limit leakage of the fuel from the fuel passage to the outside of the housing through the gap(s). As a result, in the present embodiment, the high pressure fuel can be injected while limiting the leakage of the fuel from the fuel passage to the outside of the housing.

In another fuel injection device of the present disclosure, the inside projection is formed in one piece with one of the first tubular member and the second tubular member such that the inside projection projects in a tubular form from an end surface of the one of the first tubular member and the second tubular member toward another one of the first tubular member and the second tubular member and is connected to the another one of the first tubular member and the second tubular member.

Furthermore, the outside projection is formed in one piece with the another one of the first tubular member and the second tubular member such that the outside projection projects in a tubular form from an end surface of the another one of the first tubular member and the second tubular member toward the one of the first tubular member and the second tubular member and is connected to the one of the first tubular member and the second tubular member while an inner wall of the outside projection contacts an outer wall of the inside projection.

In the present disclosure, the outside projection, which is formed in one piece with the another one of the first tubular member and the second tubular member, is placed on the radially outer side of the inside projection, which is formed in one piece with the one of the first tubular member and the second tubular member while the outer wall of the inside projection contacts the inner wall of the outside projection. Therefore, even when the pressure of the fuel, which is present in the fuel passage, is increased, it is possible to limit radial deformation of the inside projection. Thereby, it is possible to limit concentration of a stress at the connecting portion, at which the inside projection is connected to the another one of the first tubular member and the second tubular member, and the connection at which the outside projection is connected to the one of the first tubular member and the second tubular member. As a result, it is possible to limit fracturing of the above connecting portions and generation of a gap at the above connecting portions. Therefore, it is possible to limit leakage of the fuel from the fuel passage to the outside of the housing through the gap(s). As a result, in the present embodiment, the high pressure fuel can be injected while limiting the leakage of the fuel from the fuel passage to the outside of the housing.

DESCRIPTION OF EMBODIMENTS

Hereinafter, various embodiments of the present disclosure will be described with reference to the accompanying drawings. In the following embodiments, substantially identical parts are indicated by the same reference signs and will not be described redundantly for the sake of simplicity.

First Embodiment

Figure 1:
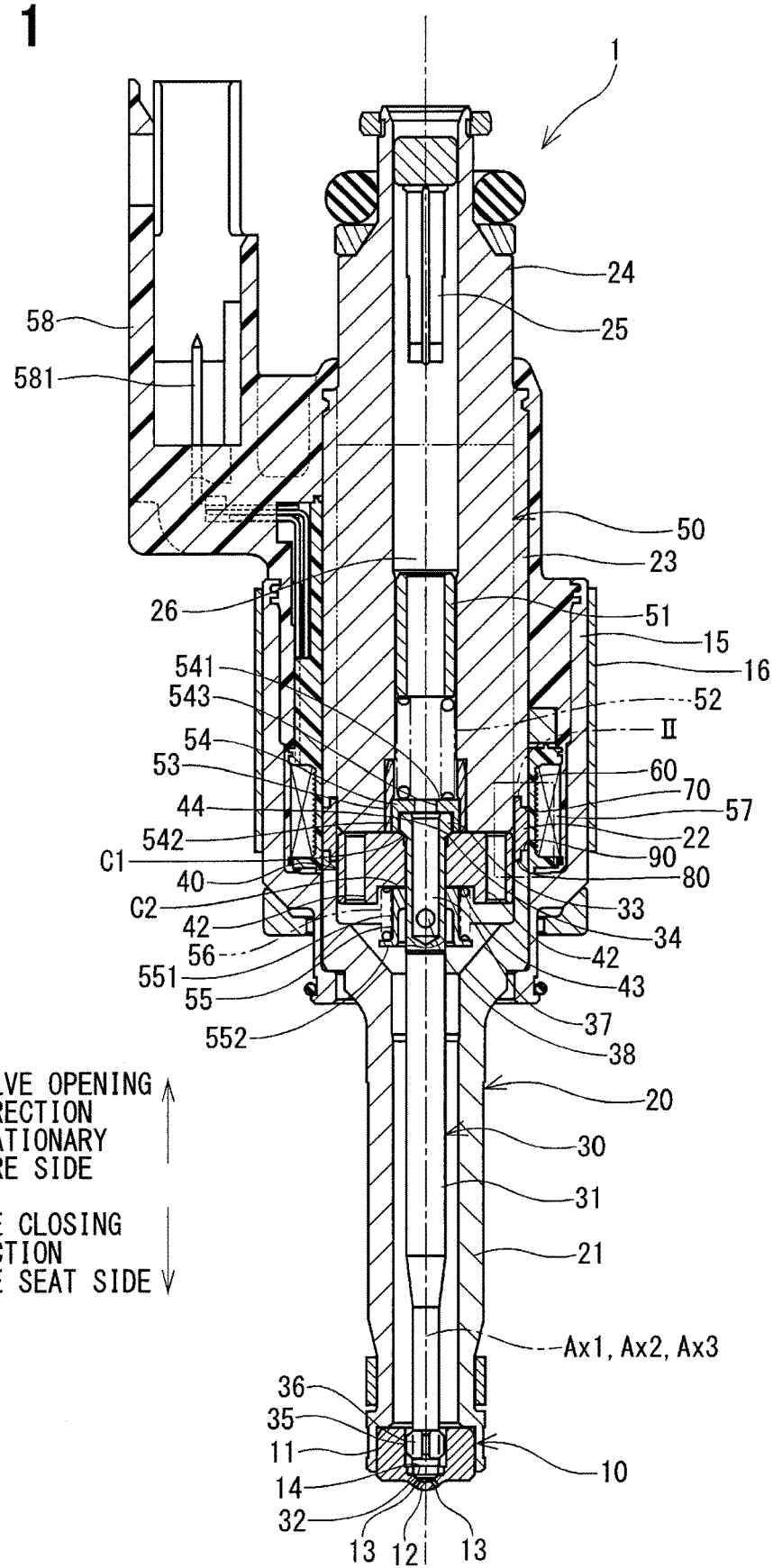
FIG. 1 is a cross-sectional view showing a fuel injection device according to a first embodiment of the present disclosure.

FIG. 1 shows a fuel injection device according to a first embodiment of the present disclosure. The fuel injection device 1 is used for, for example, a direct injection type gasoline engine (not shown), which serves as an internal combustion engine, to inject gasoline, which serves as fuel, in the engine.

The fuel injection device 1 includes a nozzle 10, a housing 20, a needle 30, a movable core 40, a stationary core 50, a spring (serving as a valve seat side urging member) 52, a gap forming member 54, a coil 57, inside projections 60, 80 and outside projections 70, 90.

The nozzle 10 is made of metal, such as martensitic stainless steel. The nozzle 10 is processed through a quenching process to have a predetermined degree of hardness. As shown in FIG. 1, the nozzle 10 includes a nozzle tube portion 11, a nozzle bottom portion 12, injection holes 13 and a valve seat 14.

The nozzle tube portion 11 is shaped into a tubular form. The nozzle bottom portion 12 closes one end of the nozzle tube portion 11. Each of the injection holes 13 connects between a nozzle tube portion 11 side surface, i.e., an inner wall of the nozzle bottom portion 12 and an opposite side surface, i.e., an outer wall of the nozzle bottom portion 12, which is opposite from the nozzle tube portion 11, to inject the fuel. In the present embodiment, the plurality of injection holes 13 is formed at the nozzle bottom portion 12. At the nozzle tube portion 11 side of the nozzle bottom portion 12, the valve seat 14 is formed into a ring form around the injection holes 13.

The housing 20 includes a first tubular member 21, a second tubular member 22, a third tubular member 23, an inlet portion 24, and a filter 25.

The first tubular member 21, the second tubular member 22 and the third tubular member 23 are respectively shaped into a generally cylindrical tubular form. The first tubular member 21, the second tubular member 22 and the third tubular member 23 are coaxially arranged one after another in this order along an axis Ax1 and are joined together through the inside projection 60, the outside projection 70, the inside projection 80 and the outside projection 90. The inside projection 60, the outside projection 70, the inside projection 80 and the outside projection 90 will be described later in detail.

The first tubular member 21 and the third tubular member 23 are made of a magnetic material, such as ferritic stainless steel and are processed through a magnetic stabilization process. The first tubular member 21 and the third tubular member 23 have a relatively low degree of hardness. In contrast, the second tubular member 22 is made of a non-magnetic material, such as, austenitic stainless steel. The degree of hardness of the second tubular member 22 is higher than the degree of hardness of the first tubular member 21 and the third tubular member 23.

An end part of the nozzle tube portion 11 of the nozzle 10, which is opposite from the nozzle bottom portion 12, is connected to an inside of an end part of the first tubular member 21, which is opposite from the second tubular member 22. The first tubular member 21 and the nozzle 10 are joined together by, for example, welding.

The inlet portion 24 is made of a magnetic material, such as ferritic stainless steel, and is shaped into a tubular form. The inlet portion 24 is formed such that an end part of the inlet portion 24 is connected to an inside of an end part of the third tubular member 23, which is opposite from the second tubular member 22. In the present embodiment, the inlet portion 24 is integrally formed from a material that is the same as the material of the third tubular member 23.

A fuel passage 26 is formed in an inside of the housing 20. The fuel passage 26 is communicated with the injection holes 13. A pipe (not shown) is connected to an opposite side of the inlet portion 24, which is opposite from the third tubular member 23. Thereby, the fuel is supplied from a fuel supply source to the fuel passage 26 through the pipe. The fuel passage 26 conducts the fuel to the injection holes 13.

The filter 25 is installed in an inside of the inlet portion 24. The filter 25 collects foreign objects contained in the fuel to be supplied to the fuel passage 26.

The needle 30 is made of metal, such as martensitic stainless steel, and is shaped into a rod form. The needle 30 is processed through a quenching process to have a predetermined degree of hardness. The degree of hardness of the needle 30 is set to be substantially the same as the degree of hardness of the nozzle 10.

The needle 30 is received in the housing 20 in such a manner that the needle 30 is reciprocatable in the fuel passage 26 in an axial direction of the axis (central axis) Ax1 of the housing 20. The needle 30 includes a needle main body 31, a seatable portion 32, a flange portion 33 and a large diameter portion 35.

The needle main body 31 is shaped into a generally cylindrical form. The seatable portion 32 is formed at an end part of the needle main body 31, which is located on a side where the valve seat 14 is placed, and the seatable portion 32 is engageable with the valve seat 14. The flange portion 33 is shaped into a ring form and is formed at an end part of the needle main body 31, which is opposite from the valve seat 14. The flange portion 33 is formed in one piece with the needle main body 31.

The large diameter portion 35 is formed in one piece with the needle main body 31 at a location that is adjacent to the seatable portion 32. The large diameter portion 35 is formed to have an outer diameter that is larger than an outer diameter of the end part of the needle main body 31, which is located on the valve seat 14 side. The large diameter portion 35 is formed such that an outer wall of the large diameter portion 35 is slidable along an inner wall of the nozzle tube portion 11. In this way, the end part of the needle 30, which is located on the valve seat 14 side, is reciprocatably guided in the axial direction of the axis Ax1. Cutouts 36 are formed in the outer wall of the large diameter portion 35 such that the cutouts 36 are arranged one after another in the circumferential direction. In this way, the fuel can flow between the cutouts 36 and the inner wall of the nozzle tube portion 11.

An axial hole 37, which extends along the axis Ax2 of the needle main body 31, is formed at the end part of the needle main body 31, which is opposite from the seatable portion 32. That is, the end part of the needle main body 31, which is opposite from the seatable portion 32, is shaped into a hollow tubular form. Furthermore, a radial hole 38 is formed in the needle main body 31 such that the radial hole 38 extends in a radial direction of the needle main body 31 to communicate between an end part of the axial hole 37, which is located on the side where the valve seat 14 is placed, and a space located at an outside of the needle main body 31. In this way, the fuel in the fuel passage 26 can flow in the axial hole 37 and the radial hole 38.

The needle 30 opens or closes the injection holes 13 when the needle 30 is lifted from the valve seat 14 or is seated against the valve seat 14, respectively. Hereinafter, a direction of lifting the needle 30 from the valve seat 14 will be referred to as a valve opening direction, and a direction of seating the needle 30 against the valve seat 14 will be referred to as a valve closing direction.

The movable core 40 is made of a magnetic material, such as ferritic stainless steel, and is shaped into a generally cylindrical form. The movable core 40 is processed through a magnetic stabilization process. A degree of hardness of the movable core 40 is relatively low and is generally the same as the degree of hardness of the first tubular member 21 and the third tubular member 23 of the housing 20.

The movable core 40 includes a shaft hole 41, a plurality of holes 42 and a recess 43. The shaft hole 41 is formed to extend along an axis Ax3 of the movable core 40. Each of the holes 42 is formed to connect between one end surface of the movable core 40, which is located on the valve seat 14 side, and an opposite end surface of the movable core 40, which is opposite from the valve seat 14. Each hole 42 has an inner wall that is shaped into a cylindrical tubular form. The holes 42 are formed to be parallel with the axis Ax3 of the movable core 40. In the present embodiment, the number of the holes 42 is four, and these four holes 42 are arranged one after another at equal intervals in the circumferential direction of the movable core 40.

The recess 43 is formed at a center of the movable core 40 such that the recess 43 is recessed as a circular recess from the end surface of the movable core 40, which is located on the valve seat 14 side, toward the opposite side that is opposite from the valve seat 14. Here, the shaft hole 41 is formed to communicate between a bottom of the recess 43 of the movable core 40 and the end surface of the movable core 40, which is opposite from the valve seat 14.

The movable core 40 is received in the housing 20 in a state where the needle main body 31 of the needle 30 is inserted through the shaft hole 41. The movable core 40 is coaxial with the needle main body 31 of the needle 30. An inner diameter of the shaft hole 41 of the movable core 40 is set to be equal to or slightly larger than an outer diameter of the needle main body 31 of the needle 30. Thereby, the movable core 40 is movable relative to the needle 30 such that the inner wall of the shaft hole 41 of the movable core 40 is slid along an outer wall of the needle main body 31 of the needle 30. Furthermore, similar to the needle 30, the movable core 40 is received in the housing 20 such that the movable core 40 is reciprocatable in the fuel passage 26 in the axial direction of the axis Ax1 of the housing 20. The fuel, which is present in the fuel passage 26, can flow through the holes 42.

An outer diameter of the movable core 40 is set to be smaller than inner diameters of the first tubular member 21 and of the second tubular member 22 of the housing 20. Therefore, when the movable core 40 is reciprocated in the fuel passage 26, the outer wall of the movable core 40 does not slide along an inner wall of the first tubular member 21 and an inner wall of the second tubular member 22.

The flange portion 33 of the needle 30 includes a contact surface 34, which is shaped into a ring form and is located on the valve seat 14 side. The contact surface 34 is tapered such that the contact surface 34 progressively gets closer to the axis Ax2 from the one side to the other side in the axial direction of the axis Ax2. Furthermore, the movable core 40 has a contact surface 44 at an end part of the shaft hole 41, which is opposite from the recess 43. The contact surface 44 is tapered such that the contact surface 44 progressively gets closer to the axis Ax3 from the one side to the other side in the axial direction of the axis Ax3. The contact surface 34 of the flange portion 33 and the contact surface 44 of the movable core 40 are engageable with each other through a surface-to-surface contact.

The movable core 40 is formed to be movable relative to the needle 30 such that the contact surface 44 is engageable with the contact surface 34 or is disengageable from the contact surface 34. In the state where the contact surface 44 is engaged with the contact surface 34, the movable core 40 can reciprocate in the fuel passage 26 together with the needle 30.

The stationary core 50 is made of a magnetic material, such as ferritic stainless steel, and is shaped into a generally cylindrical tubular form. The stationary core 50 is processed through a magnetic stabilization process. A degree of hardness of the stationary core 50 is relatively low and is generally the same as the degree of hardness of the movable core 40. The stationary core 50 is placed on an opposite side of the movable core 40, which is opposite from the valve seat 14. The stationary core 50 is formed such that an outer wall of the stationary core 50 is joined to an inner wall of the third tubular member 23 of the housing 20, and an end part of the stationary core 50, which is opposite from the valve seat 14, is joined to the inlet portion 24. In the present embodiment, the stationary core 50 is made of the same material as that of the third tubular member 23 and the inlet portion 24 and is formed integrally with the third tubular member 23 and the inlet portion 24 as a one-piece body (see FIG. 1). An end surface of the stationary core 50, which is located on the valve seat 14 side, is engageable with the end surface of the movable core 40, which is located on the stationary core 50 side.

The stationary core 50 is formed such that the flange portion 33 of the needle 30, which is in the state where the seatable portion 32 is engaged with the valve seat 14, is placed in the inside of the end part of the stationary core 50, which is located on the valve seat 14 side. An adjusting pipe 51, which is shaped into a cylindrical tubular form, is press fitted into the inside of the stationary core 50.

The spring 52 is, for example, a coil spring and is placed between the adjusting pipe 51, which is located in the inside of the stationary core 50, and the flange portion 33 of the needle 30. One end of the spring 52 is engaged with the adjusting pipe 51.

The gap forming member 54 is placed between the needle 30 and the spring 52. The gap forming member 54 is made of metal, such as martensitic stainless steel. A degree of hardness of the gap forming member 54 is generally the same as the degree of hardness of the needle 30.

In the present embodiment, the gap forming member 54 is shaped into a bottomed cylindrical tubular form. The gap forming member 54 includes a plate portion 541 and a leg portion 542. The plate portion 541 is shaped into a generally circular disk form. The leg portion 542 is formed in one piece with the plate portion 541 such that the leg portion 542 extends from an outer peripheral edge part of the plate portion 541 toward the valve seat 14 and is shaped into a cylindrical tubular form. The gap forming member 54 is formed such that the flange portion 33 of the needle 30 is placed in an inside of the leg portion 542.

An inner diameter of the leg portion 542 of the gap forming member 54 is set to be equal to or slightly larger than an outer diameter of the flange portion 33. Therefore, the gap forming member 54 is movable relative to the needle 30 while an inner wall of the leg portion 542 is slid along an outer wall of the flange portion 33. An end surface of the plate portion 541, which is located on the leg portion 542 side, is engageable with the flange portion 33 and an end surface of the needle main body 31 of the needle 30, which is opposite from the valve seat 14. An end part of the leg portion 542, which is opposite from the plate portion 541, is engageable with the end surface of the movable core 40, which is located on the stationary core 50 side.

The stationary core 50 includes a tubular member 53 that is placed in the inside of an end part of the stationary core 50, which is located on the movable core 40 side. The tubular member 53 is made of metal, such as martensitic stainless steel. The degree of hardness of the tubular member 53 is set to be substantially the same as the degree of hardness of the gap forming member 54. The gap forming member 54 is placed in an inside of an end part of the tubular member 53, which is located on the movable core 40 side. An inner diameter of the tubular member 53 is set to be equal to or slightly larger than an outer diameter of the plate portion 541 and an outer diameter of the leg portion 542 of the gap forming member 54. Thereby, the gap forming member 54 is movable relative to the tubular member 53 such that an outer wall of the plate portion 541 and an outer wall of the leg portion 542 are slid along an inner wall of the tubular member 53. In this way, the reciprocation of the flange portion 33 side end part of the needle 30 in the axial direction of the axis Ax1 is guided by the tubular member 53 through the leg portion 542 of the gap forming member 54.

The other end of the spring 52 is engaged with an end surface of the plate portion 541 of the gap forming member 54, which is opposite from the leg portion 542. The spring 52 urges the gap forming member 54 toward the valve seat 14 side. In the state where the plate portion 541 of the gap forming member 54 is engaged with the needle 30, the spring 52 can urge the needle 30 through the gap forming member 54 toward the valve seat 14 side, i.e., the valve closing direction. Furthermore, in the state where the leg portion 542 of the gap forming member 54 is engaged with the movable core 40, the spring 52 can urge the movable core 40 through the gap forming member 54 toward the valve seat 14 side. The urging force of the spring 52 is adjusted by a position of the adjusting pipe 51.

In the present embodiment, the leg portion 542 of the gap forming member 54 is formed such that an axial length of the leg portion 542 is larger than an axial length of the flange portion 33. Therefore, in the state where the plate portion 541 is engaged with the needle 30, and the leg portion 542 is engaged with the movable core 40, the gap forming member 54 can form a gap C1 between the contact surface 34 of the flange portion 33 and the contact surface 44 of the movable core 40.

The gap forming member 54 includes a hole 543. The hole 543 is formed to extend through a center of the plate portion 541 in a plate thickness direction of the plate portion 541. Thereby, the fuel, which is located in the fuel passage 26 on the opposite side of the gap forming member 54 that is opposite from the valve seat 14, can flow to the valve seat 14 side of the movable core 40 through the hole 543, the axial hole 37 and the radial hole 38 of the needle 30.

In the present embodiment, the fuel injection device 1 further includes a limiter 55 and a spring 56. The limiter 55 is made of metal, such as stainless steel. The limiter 55 includes a tubular portion 551 and a spring seat portion 552. The limiter 55 is installed to the needle 30 such that the needle main body 31 of the needle 30 is inserted through an inside of the tubular portion 551. Here, the movable core 40 is formed such that the movable core 40 is reciprocatable in the axial direction between the flange portion 33 of the needle 30 and the limiter 55. The bottom of the recess 43 of the movable core 40 is engageable with an end part of the tubular portion 551 of the limiter 55, which is located on the movable core 40 side.

In the present embodiment, the limiter 55 is formed such that an inner wall of the end part of the tubular portion 551, which is located on the movable core 40 side, is securely fitted to the outer wall of the needle main body 31. Therefore, the limiter 55 is not movable relative to the needle 30. Thereby, the limiter 55 can limit movement of the movable core 40 relative to the needle 30 toward the valve seat 14 side when the tubular portion 551 is engaged with the movable core 40.

An inner diameter of an end part of the tubular portion 551, which is located on the valve seat 14 side, is set to be larger than an inner diameter of the end part of the tubular portion 551, which is located on the movable core 40 side. Therefore, a cylindrical gap is formed between the inner wall of the end part of the tubular portion 551, which is located on the valve seat 14 side, and the outer wall of the needle main body 31 of the needle 30. This cylindrical gap is communicated with the radial hole 38 of the needle 30. Therefore, the fuel in the axial hole 37 of the needle 30 can flow toward the valve seat 14 through the radial hole 38 and the cylindrical gap in the inside of the tubular portion 551.

The spring seat portion 552 is formed in one piece with the tubular portion 551 such that the spring seat portion 552 extends radially outward from the end part of the tubular portion 551 located on the valve seat 14 side and is shaped into a ring form.

The spring 56 is, for example, a coil spring and is formed such that one end of the spring 56 is engaged with the bottom of the recess 43 of the movable core 40, and the other end of the spring 56 is engaged with the spring seat portion 552. The spring 56 can urge the movable core 40 toward the stationary core 50 side. An urging force of the spring 56 is smaller than an urging force of the spring 52.

When the spring 52 urges the gap forming member 54 toward the valve seat 14 side, the plate portion 541 of the gap forming member 54 is engaged with the needle 30, and the seatable portion 32 of the needle 30 is urged against the valve seat 14. At this time, the spring 56 urges the movable core 40 toward the stationary core 50 side, so that the leg portion 542 of the gap forming member 54 is engaged with the end surface of the movable core 40, which is located on the stationary core 50 side. In this state, the gap C1 is formed between the contact surface 34 of the flange portion 33 of the needle 30 and the contact surface 44 of the movable core 40, and a gap C2 is formed between the bottom of the recess 43 of the movable core 40 and the tubular portion 551 of the limiter 55.

In the present embodiment, the needle 30 is supported such that the end part of the needle 30, which is located on the valve seat 14 side, is reciprocatably supported by the inner wall of the nozzle tube portion 11 of the nozzle 10, and the end part of the needle 30, which is located on the flange portion 33 side, is reciprocatably supported by the gap forming member 54 and the inner wall of the tubular member 53. As discussed above, the reciprocation of the needle 30 in the axial direction of the axis Ax2 is guided at the two locations, which are located one after another in the axial direction of the axis Ax2.

The coil 57 is shaped into a generally cylindrical tubular form and is formed to surround the radially outer side of the second tubular member 22 and the radially outer side of the third tubular member 23 of the housing 20. Furthermore, a holder 15, which is shaped into a tubular form, is placed on a radially outer side of the coil 57 such that the holder 15 covers the coil 57. The holder 15 is made of a magnetic material, such as ferritic stainless steel.

When an electric power is supplied to the coil 57 (when the coil 57 is energized), the coil 57 generates a magnetic force. When the magnetic force is generated at the coil 57, a magnetic circuit is formed in the stationary core 50, the movable core 40, the first tubular member 21, the holder 15 and the third tubular member 23. Thereby, a magnetic attractive force is generated between the stationary core 50 and the movable core 40, so that the movable core 40 is magnetically attracted to the stationary core 50. At this time, the movable core 40 is moved and is accelerated in the valve opening direction in the gap C1, and the contact surface 44 of the movable core 40 collides against the contact surface 34 of the flange portion 33 of the needle 30. Thereby, the needle 30 is moved in the valve opening direction, so that the seatable portion 32 is lifted from the valve seat 14 to cause the valve opening state of the needle 30. Therefore, the injection holes 13 are opened. Thus, when the coil 57 is energized, the movable core 40 can be magnetically attracted toward the stationary core 50 to move the needle 30 toward the side that is opposite from the valve seat 14.

As discussed above, according to the present embodiment, the gap forming member 54 forms the gap C1 between the flange portion 33 and the movable core 40 in the valve closing state. Therefore, at the time of energizing the coil 57, the movable core 40 can be accelerated in the gap C1 and can collide against the flange portion 33. In this way, even in the case where the pressure in the fuel passage 26 is relatively high, the needle 30 can be placed into the valve opening state without increasing the electric power supplied to the coil 57.

When the movable core 40 is magnetically attracted to the stationary core 50 side (the valve opening direction) by the magnetic attractive force, the end surface of the movable core 40, which is located on the stationary core 50 side, collides against the end surface of the stationary core 50, which is located on the movable core 40 side. In this way, the movement of the movable core 40 in the valve opening direction is limited.

When the energization of the coil 57 is stopped in the state where the movable core 40 is magnetically attracted to the stationary core 50, the needle 30 and the movable core 40 are urged toward the valve seat 14 side by the urging force of the spring 52, which is applied through the gap forming member 54. In this way, the needle 30 is moved in the valve closing direction, and thereby the seatable portion 32 of the needle 30 is engaged with the valve seat 14 to place the needle 30 in the valve closing state. Therefore, the injection holes 13 are closed.

In the present embodiment, the movable core 40 is moved relative to the needle 30 toward the valve seat 14 side by inertia after the engagement of the seatable portion 32 with the valve seat 14. At this time, the limiter 55 can limit the excessive movement of the movable core 40 toward the valve seat 14 side through the engagement of the limiter 55 with the movable core 40. In this way, it is possible to limit a deterioration in responsiveness at the time of next valve opening. Furthermore, a shock at the time of engaging the movable core 40 with the limiter 55 can be reduced by the urging force of the spring 56. Thereby, it is possible to limit occurrence of secondary valve opening, which is caused by bouncing of the needle 30 at the valve seat 14. Also, when the limiter 55 limits the movement of the movable core 40 toward the valve seat 14 side, it is possible to limit excessive compression of the spring 56. Thereby, it is possible to limit occurrence of secondary valve opening, which is caused by recollision of the movable core 40 against the flange portion 33 that is induced by urging of the movable core 40 in the valve opening direction with a restoring force of the spring 56 that has been excessively compressed.

As shown in FIG. 1, the radially outer side of the inlet portion 24 and the third tubular member 23 are insert molded with resin. A connector portion 58 is formed at this resin molded portion. Terminals 581, which are used for supplying the electric power to the coil 57, are insert molded at the connector portion 58. A tubular member 16, which is made of metal and is shaped into a tubular form, is placed on the radially outer side of the holder 15.

The fuel, which is inputted through the inlet portion 24, flows through the inside of the stationary core 50, the inside of the adjusting pipe 51, the hole 543 of the gap forming member 54, the axial hole 37, the radial hole 38 of the needle 30, the space between the first tubular member 21 and the needle 30, and the space between the nozzle 10 and the needle 30, that is, the fuel flows through the fuel passage 26 and is conducted to the injection holes 13. At the time of operating the fuel injection device 1, an area around the movable core 40 is filled with the fuel. Furthermore, at the time of operating the fuel injection device 1, the fuel flows through the holes 42 of the movable core 40. Therefore, the movable core 40 can be smoothly reciprocated in the axial direction in the inside of the housing 20.

Figure 2:
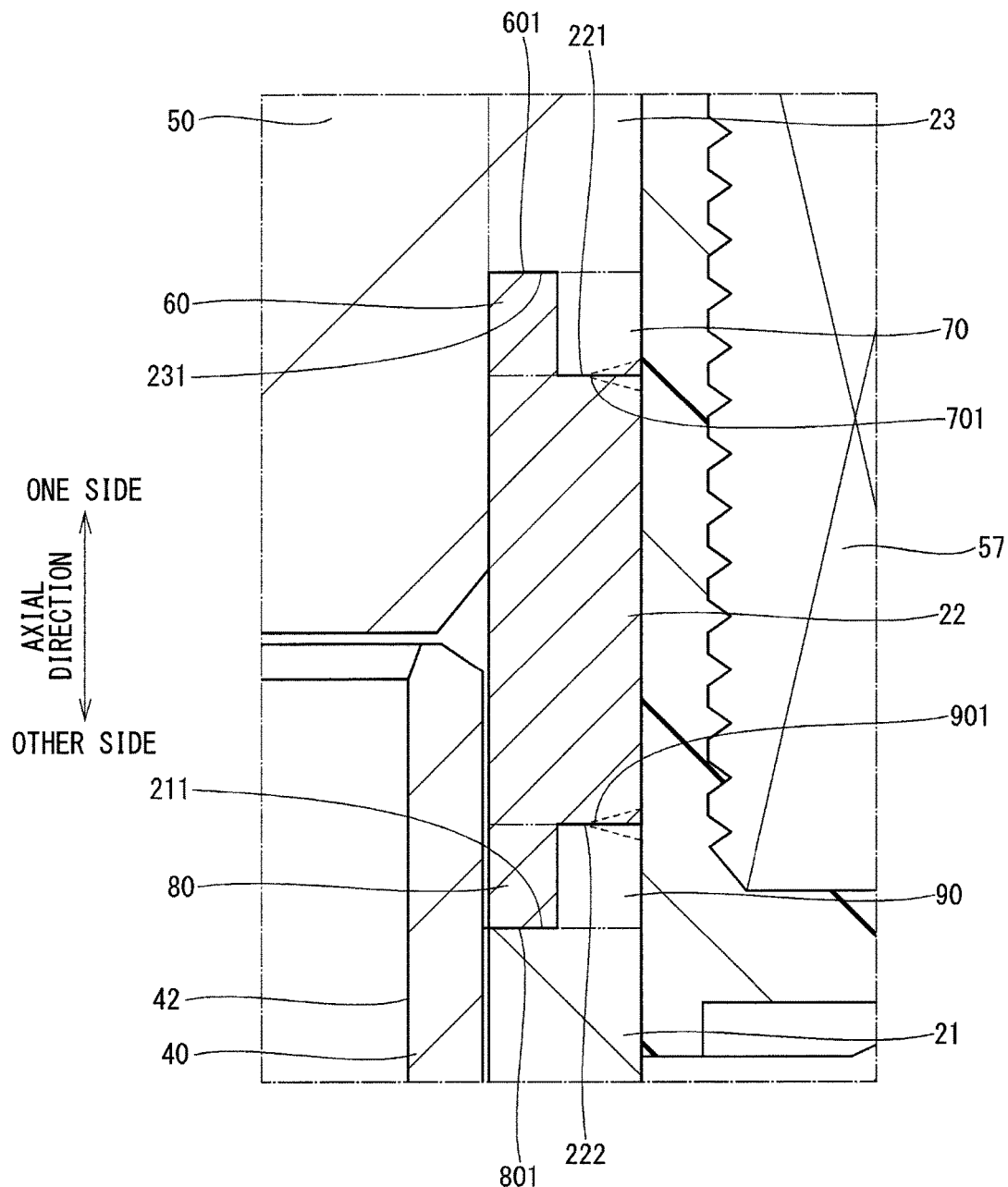
FIG. 2 is an enlarged view of a portion II in FIG. 1.

Next, the inside projection 60, the outside projection 70, the inside projection 80 and the outside projection 90 will be described in detail with reference to FIG. 2.

In the present embodiment, an inner diameter and an outer diameter are equally set among the first tubular member 21, the second tubular member 22 and the third tubular member 23.

Similar to the second tubular member 22, the inside projection 60 is made of the non-magnetic material, such as austenitic stainless steel. The inside projection 60 is formed in one piece with the second tubular member 22 such that the inside projection 60 projects from an end surface 221 of the second tubular member 22, which is located on the third tubular member 23 side, toward the third tubular member 23 and is shaped into a generally cylindrical tubular form, while an end surface 601 of the inside projection 60 is connected to an end surface 231 of the third tubular member 23, which is located on the second tubular member 22 side. Here, an inner diameter of the inside projection 60 is the same as the inner diameter of the second tubular member 22. Further-more, an outer diameter of the inside projection 60 is smaller than the outer diameter of the second tubular member 22.

Similar to the third tubular member 23, the outside projection 70 is made of the magnetic material, such as ferritic stainless steel. The outside projection 70 is formed in one piece with the third tubular member 23 such that the outside projection 70 projects from an end surface 231 of the third tubular member 23, which is located on the second tubular member 22 side, toward the second tubular member 22 and is shaped into a generally cylindrical tubular form, while an end surface 701 of the outside projection 70 is connected to the end surface 221 of the second tubular member 22, which is located on the third tubular member 23 side. Here, an inner diameter of the outside projection 70 is the same as the outer diameter of the inside projection 60. Therefore, a radially inner wall (hereinafter simply referred to as an inner wall) of the outside projection 70, which is located on the radially inner side, is engaged with a radially outer wall (hereinafter simply referred to as an outer wall) of the inside projection 60, which is located on the radially outer side, through a surface-to-surface contact. Further-more, an outer diameter of the outside projection 70 is the same as the outer diameter of the third tubular member 23.

Similar to the second tubular member 22, the inside projection 80 is made of the non-magnetic material, such as austenitic stainless steel. The inside projection 80 is formed in one piece with the second tubular member 22 such that the inside projection 80 projects from an end surface 222 of the second tubular member 22, which is located on the first tubular member 21 side, toward the first tubular member 21 and is shaped into a generally cylindrical tubular form, while an end surface 801 of the inside projection 80 is connected to an end surface 211 of the first tubular member 21, which is located on the second tubular member 22 side. Here, an inner diameter of the inside projection 80 is the same as the inner diameter of the second tubular member 22. Furthermore, an outer diameter of the inside projection 80 is smaller than the outer diameter of the second tubular member 22. Furthermore, in the present embodiment, the outer diameter of the inside projection 80 is the same as the outer diameter of the inside projection 60 and the inner diameter of the outside projection 70.

Similar to the first tubular member 21, the outside projection 90 is made of the magnetic material, such as ferritic stainless steel. The outside projection 90 is formed in one piece with the first tubular member 21 such that the outside projection 90 projects from the end surface 211 of the first tubular member 21, which is located on the second tubular member 22 side, toward the second tubular member 22 and is shaped into a generally cylindrical tubular form, while an end surface 901 of the outside projection 90 is connected to the end surface 222 of the second tubular member 22, which is located on the first tubular member 21 side. Here, an inner diameter of the outside projection 90 is the same as the outer diameter of the inside projection 80. Therefore, a radially inner wall (hereinafter simply referred to as an inner wall) of the outside projection 90, which is located on the radially inner side, is engaged with a radially outer wall (hereinafter simply referred to as an outer wall) of the inside projection 80, which is located on the radially outer side, through a surface-to-surface contact. Furthermore, an outer diameter of the outside projection 90 is the same as the outer diameter of the first tubular member 21.

In the present embodiment, a connecting portion, at which the second tubular member 22 and the outside projection 70 are connected with each other, is welded along an entire circumferential extent of this connecting portion. Furthermore, a connecting portion, at which the second tubular member 22 and the outside projection 90 are connected with each other, is welded along an entire circumferential extent of this connecting portion. In this way, the fuel passage 26 in the inside of the housing 20 is fluid tightly held, and it is possible to limit separation of the first tubular member 21, the second tubular member 22 and the third tubular member 23 from one another in the axial direction.

In the present embodiment, the outside projection 70, which is formed in one piece with the third tubular member 23, is placed on the radially outer side of the inside projection 60, which is formed in one piece with the second tubular member 22, and the outer wall of the inside projection 60 is engaged with the inner wall of the outside projection 70. Therefore, even when the pressure of the fuel in the fuel passage 26 becomes large, radial deformation of the inside projection 60 can be limited.

Furthermore, the outside projection 90, which is formed in one piece with the first tubular member 21, is placed on the radially outer side of the inside projection 80, which is formed in one piece with the second tubular member 22, and the outer wall of the inside projection 80 is engaged with the inner wall of the outside projection 90. Therefore, even when the pressure of the fuel in the fuel passage 26 becomes large, radial deformation of the inside projection 60 can be limited.

As discussed above, (1), (2) in the present embodiment, the housing 20 includes the first tubular member 21, the second tubular member 22, the third tubular member 23 and the fuel passage 26.

The first tubular member 21 is formed such that the one end part of the first tubular member 21 is connected to the opposite side of the nozzle tube portion 11, which is opposite from the nozzle bottom portion 12.

The second tubular member 22 is formed such that the one end part of the second tubular member 22 is placed at the other end side of the first tubular member 21.

The third tubular member 23 is formed such that the one end part of the third tubular member 23 is placed at the other end side of the second tubular member 22.

The fuel passage 26 is formed in the inside of the first tubular member 21, the second tubular member 22 and the third tubular member 23 such that the fuel passage 26 conducts the fuel to the injection holes 13.

The inside projection 60 is formed in one piece with the second tubular member 22 such that the inside projection 60 projects in the tubular form from the end surface 221 of the second tubular member 22 located on the third tubular member 23 side and is connected to the third tubular member 23.

The outside projection 70 is formed in one piece with the third tubular member 23 such that the outside projection 70 projects in the tubular form from the end surface 231 of the third tubular member 23 located on the second tubular member 22 side and is connected to the second tubular member 22, while the inner wall of the outside projection 70 is engaged with the outer wall of the inside projection 60.

The inside projection 80 is formed in one piece with the second tubular member 22 such that the inside projection 80 projects in the tubular form from the end surface 222 of the second tubular member 22 located on the first tubular member 21 side and is connected to the first tubular member 21.

The outside projection 90 is formed in one piece with the first tubular member 21 such that the outside projection 90 projects in the tubular form from the end surface 211 of the first tubular member 21 located on the second tubular member 22 side and is connected to the second tubular member 22, while the inner wall of the outside projection 90 is engaged with the outer wall of the inside projection 80.

In the present embodiment, the outside projection 70, which is formed in one piece with the third tubular member 23, is placed on the radially outer side of the inside projection 60, which is formed in one piece with the second tubular member 22, and the outer wall of the inside projection 60 is engaged with the inner wall of the outside projection 70. Furthermore, the outside projection 90, which is formed in one piece with the first tubular member 21, is placed on the radially outer side of the inside projection 80, which is formed in one piece with the second tubular member 22, and the outer wall of the inside projection 80 is engaged with the inner wall of the outside projection 90. Therefore, even when the pressure of the fuel in the fuel passage 26 becomes large, radial deformation of the inside projection 60 and the inside projection 80 can be limited. Thereby, it is possible to limit concentration of a stress at the connecting portion, at which the inside projection 60 is connected to the third tubular member 23, the connecting portion, at which the outside projection 70 is connected to the second tubular member 22, the connecting portion, at which the inside projection 80 is connected to the first tubular member 21, and the connecting portion, at which the outside projection 90 is connected to the second tubular member 22. Thus, fracturing of the above connecting portions (the welded portions) and generation of a gap at the above connecting portions can be limited. Therefore, it is possible to limit leakage of the fuel from the fuel passage 26 to the outside of the housing 20 through the gap(s). As a result, in the present embodiment, the high pressure fuel can be injected while limiting the leakage of the fuel from the fuel passage 26 to the outside of the housing 20.

Furthermore, (8) in the present embodiment, the movable core 40, the stationary core 50, the coil 57 and the spring 52 are provided.

The movable core 40 is formed such that the movable core 40 is reciprocatable together with the needle 30 in the fuel passage 26.

The stationary core 50 is placed on the opposite side of the movable core 40, which is opposite from the valve seat 14, in the inside of the housing 20.

The coil 57 is placed at the outside of the housing 20. When the coil 57 is energized, the movable core 40 can be magnetically attracted to the stationary core 50 side to move the needle 30 toward the opposite side that is opposite from the valve seat 14.

The spring 52 can urge the needle 30 and the movable core 40 toward the valve seat 14 side.

The first tubular member 21 and the third tubular member 23 are made of the magnetic material.

The second tubular member 22 is made of the non-magnetic material.

Furthermore, (9) in the present embodiment, the third tubular member 23 is formed in one piece with the stationary core 50 such that the inner wall of the third tubular member 23 is joined to the outer wall of the stationary core 50. In this way, the number of the components can be reduced, and deformation of the third tubular member 23 can be limited.

Furthermore, (10) in the present embodiment, the needle 30 has the contact surface 34, which is engageable with the contact surface 44 that is the surface of the movable core 40 located on the stationary core 50 side.

The movable core 40 is formed to be movable relative to the needle 30 such that the contact surface 44 is engageable with the contact surface 34 or is disengageable from the contact surface 34. When the needle 30 and the movable core 40 are separately formed to enable relative movement therebetween, it is possible to implement the high pressure of the injecting fuel.

Furthermore, (11) in the present embodiment, there is provided the gap forming member 54, which can form the gap C1 between the contact surface 34 and the movable core 40. Therefore, at the time of energizing the coil 57, the movable core 40 can be accelerated through the gap C1 and can collide against the contact surface 34 of the flange portion 33 of the needle 30. In this way, even in the case where the pressure in the fuel passage 26 is relatively high, the needle 30 can be placed into the valve opening state without increasing the electric power supplied to the coil 57. Therefore, it is possible to implement the high pressure of the injecting fuel at the low electric power consumption.

Second Embodiment

Figure 3:
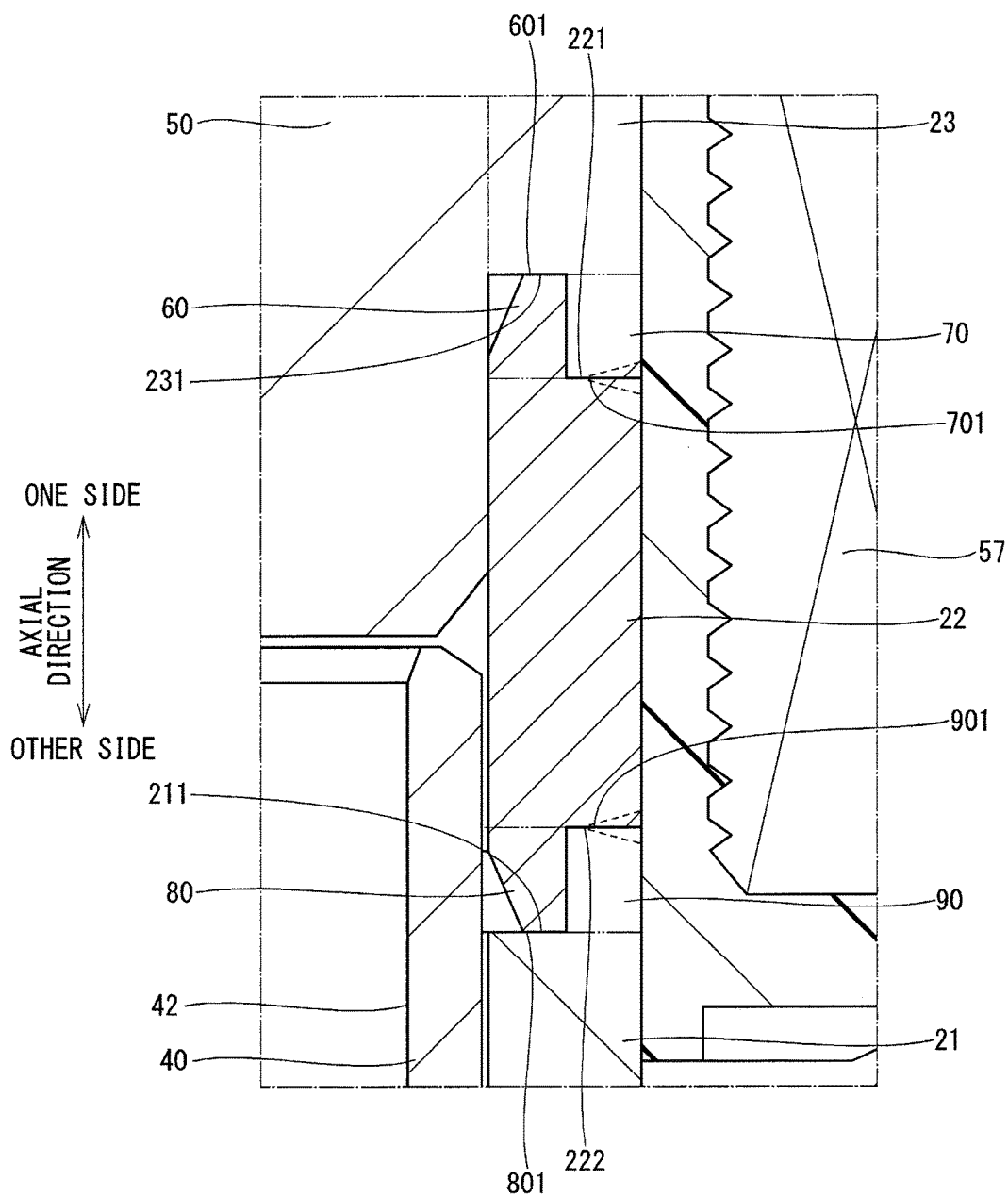
FIG. 3 is a cross-sectional view showing an inside projection and an outside projection of a fuel injection device according to a second embodiment of the present disclosure.

FIG. 3 shows a portion of a fuel injection device according to a second embodiment of the present disclosure. The second embodiment differs from the first embodiment with respect to a shape of the inside projection 60 and a shape of the inside projection 80.

In the second embodiment, a corner at an inner side of an end part of the inside projection 60, which is located on the third tubular member 23 side, is chamfered. Furthermore, a corner at an end part of the inside projection 80, which is located on the first tubular member 21 side, is chamfered.

An outer diameter of the inside projection 60 and an inner diameter of the outside projection 70 are set to be larger than the outer diameter of the inside projection 60 and the inner diameter of the outside projection 70 of the first embodiment. An outer diameter of the inside projection 80 and an inner diameter of the outside projection 90 are set to be larger than the outer diameter of the inside projection 80 and the inner diameter of the outside projection 90 of the first embodiment.

As discussed above, (3) in the present embodiment, the inside projection 60 and the inside projection 80 are formed in one piece with the second tubular member 22. A corner at an inner side of the end part of the inside projection 60, which is located on the third tubular member 23 side, is chamfered. Furthermore, a corner at an end part of the inside projection 80, which is located on the first tubular member 21 side, is chamfered. In this way, a wall thickness (a difference between the outer diameter and the inner diameter) of an end part of the inside projection 60, which is located on the second tubular member 22 side, and a wall thickness (a difference between the outer diameter and the inner diameter) of an end part of the inside projection 80, which is located on the second tubular member 22 side, can be increased. Therefore, even when the pressure of the fuel in the fuel passage 26 becomes large, it is possible to limit the radial deformation of the inside projection 60, particularly the radial deformation of the end part of the inside projection 60 located on the second tubular member 22 side as well as the radial deformation of the inside projection 80, particularly the radial deformation of the end part of the inside projection 80 located on the second tubular member 22 side.

Therefore, similar to the first embodiment, according to the present embodiment, the high pressure fuel can be injected while limiting the leakage of the fuel from the fuel passage 26 to the outside of the housing 20.

Third Embodiment

Figure 4:
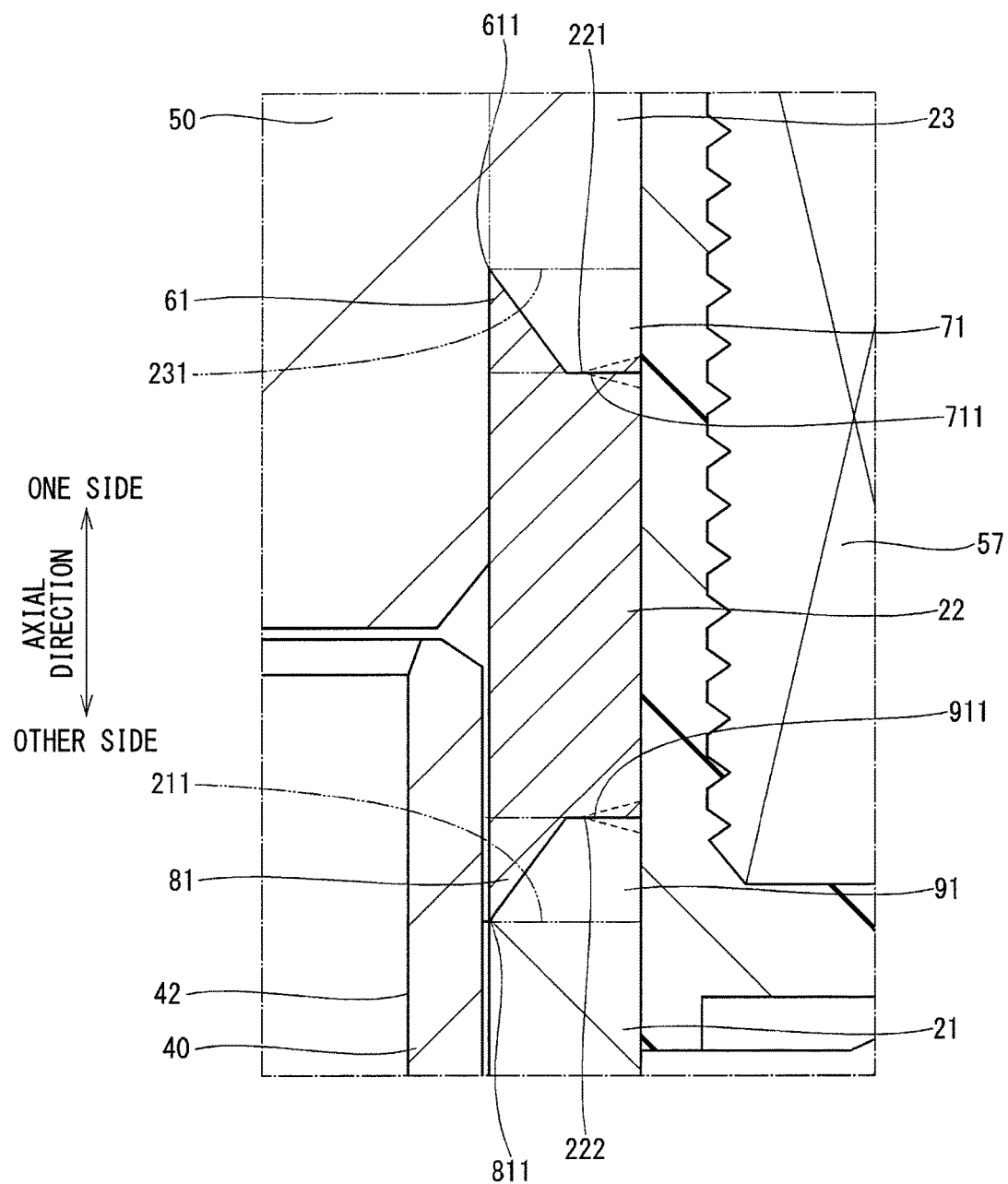
FIG. 4 is a cross-sectional view showing an inside projection and an outside projection of a fuel injection device according to a third embodiment of the present disclosure.

FIG. 4 shows a portion of a fuel injection device according to a third embodiment of the present disclosure. The third embodiment differs from the first embodiment with respect to a shape of the inside projection and a shape of the outside projection.

In the third embodiment, an inside projection 61 is formed in one piece with the second tubular member 22 such that the inside projection 61 projects from the end surface 221 of the second tubular member 22, which is located on the third tubular member 23 side, toward the third tubular member 23 and is shaped into a generally cylindrical tubular form, while an end part 611 of the inside projection 61 is connected to the end surface 231 of the third tubular member 23, which is located on the second tubular member 22 side. Here, an inner diameter of the inside projection 61 is the same as the inner diameter of the second tubular member 22. The inside projection 61 is tapered such that an outer wall of the inside projection 61 progressively gets closer to the axis (central axis) Ax1 of the housing 20 from the other side toward the one side in the axial direction.

The outside projection 71 is formed in one piece with the third tubular member 23 such that the outside projection 71 projects from the end surface 231 of the third tubular member 23, which is located on the second tubular member 22 side, toward the second tubular member 22 and is shaped into a generally cylindrical tubular form, while an end surface 711 of the outside projection 71 is connected to the end surface 221 of the second tubular member 22, which is located on the third tubular member 23 side. The outside projection 71 is tapered such that an inner wall of the outside projection 71 progressively gets closer to the axis Ax1 of the housing 20 from the other side toward the one side in the axial direction. Therefore, the inner wall of the outside projection 71 is engaged with the outer wall of the inside projection 61 through a surface-to-surface contact. Furthermore, an outer diameter of the outside projection 71 is the same as the outer diameter of the third tubular member 23.

The inside projection 81 is formed in one piece with the second tubular member 22 such that the inside projection 81 projects from the end surface 222 of the second tubular member 22, which is located on the first tubular member 21 side, toward the first tubular member 21 and is shaped into a generally cylindrical tubular form, while an end part 811 of the inside projection 81 is connected to the end surface 211 of the first tubular member 21, which is located on the second tubular member 22 side. Here, an inner diameter of the inside projection 80 is the same as the inner diameter of the second tubular member 22. Furthermore, the inside projection 81 is tapered such that an outer wall of the inside projection 81 progressively gets closer to the axis of the housing 20 from the one side toward the other side in the axial direction.

The outside projection 91 is formed in one piece with the first tubular member 21 such that the outside projection 91 projects from the end surface 211 of the first tubular member 21, which is located on the second tubular member 22 side, toward the second tubular member 22 and is shaped into a generally cylindrical tubular form, while an end surface 911 of the outside projection 91 is connected to the end surface 222 of the second tubular member 22, which is located on the first tubular member 21 side. Here, the outside projection 91 is tapered such that an inner wall of the outside projection 91 progressively gets closer to the axis of the housing 20 from the one side toward the other side in the axial direction. Therefore, the inner wall of the outside projection 91 is engaged with the outer wall of the inside projection 81 through a surface-to-surface contact. Furthermore, an outer diameter of the outside projection 91 is the same as the outer diameter of the first tubular member 21.

As described above, (4) in the present embodiment, the inside projection 61 is formed such that the outer wall of the inside projection 61 progressively gets closer to the axis of the housing 20 from the other side toward the one side in the axial direction along the entire axial extent of the outer wall of the inside projection 61. Furthermore, the inside projection 81 is formed such that the outer wall of the inside projection 81 progressively gets closer to the axis of the housing 20 from the one side toward the other side in the axial direction along the entire axial extent of the outer wall of the inside projection 81.

The outside projection 71 is formed such that the inner wall of the outside projection 71 progressively gets closer to the axis of the housing 20 from the other side toward the one side in the axial direction along the entire axial extent of the inner wall of the outside projection 71. The outside projection 91 is formed such that the inner wall of the outside projection 91 progressively gets closer to the axis of the housing 20 from the one side toward the other side in the axial direction along the entire axial extent of the inner wall of the outside projection 91.

Therefore, similar to the first embodiment, even in the present embodiment, the high pressure fuel can be injected while limiting the leakage of the fuel from the fuel passage 26 to the outside of the housing 20.

Fourth Embodiment

Figure 5:
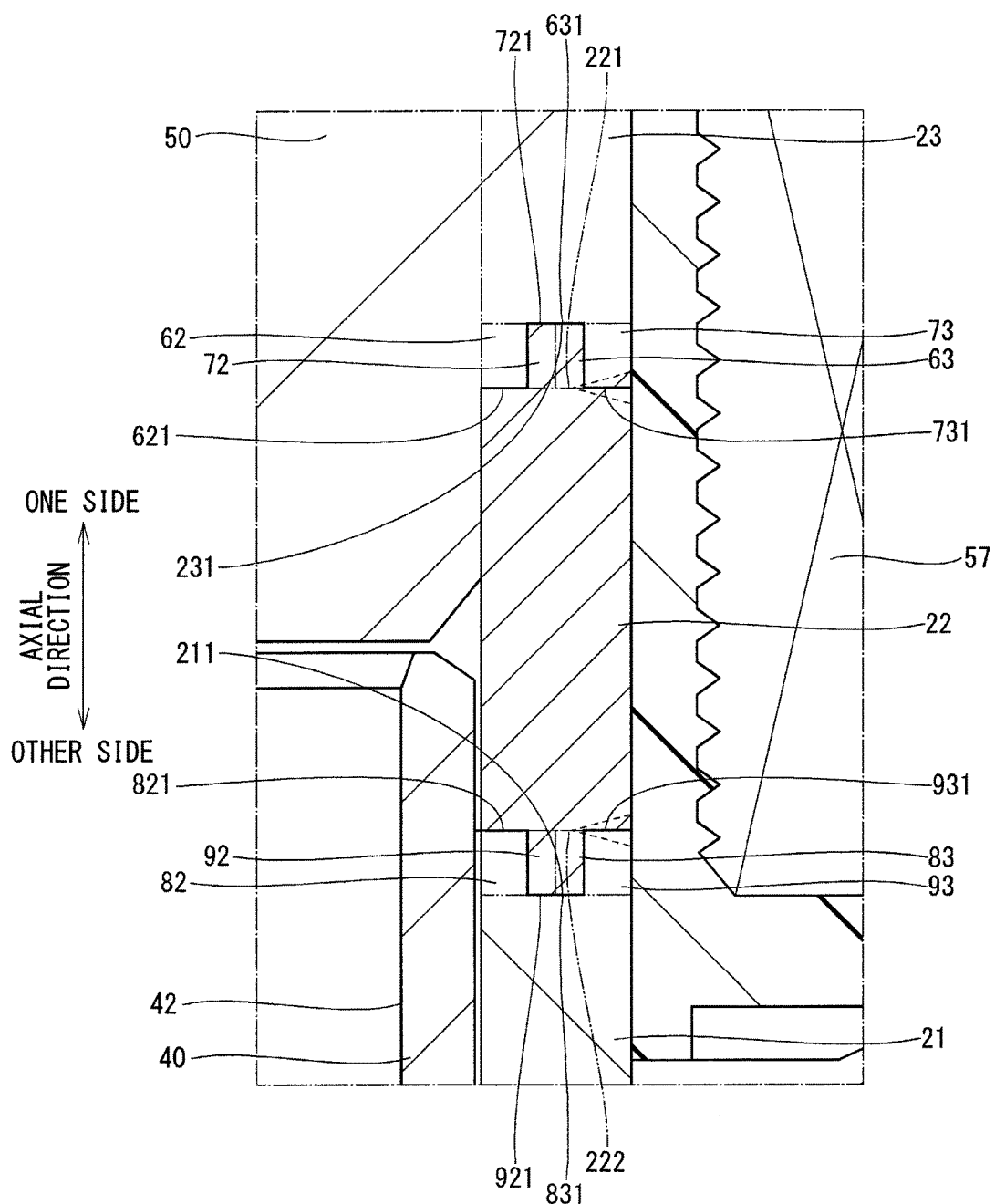
FIG. 5 is a cross-sectional view showing an inside projection and an outside projection of a fuel injection device according to a fourth embodiment of the present disclosure.

FIG. 5 shows a portion of a fuel injection device according to a fourth embodiment of the present disclosure. In the fourth embodiment, the number and the locations of the inside projections and the outside projections are different from those of the first embodiment.

In the fourth embodiment, an inside projection 62 is formed in one piece with the third tubular member 23 such that the inside projection 62 projects from the end surface 231 of the third tubular member 23, which is located on the second tubular member 22 side, toward the second tubular member 22 and is shaped into a generally cylindrical tubular form, while an end surface 621 of the inside projection 62 is connected to the end surface 221 of the second tubular member 22, which is located on the third tubular member 23 side. Here, an inner diameter of the inside projection 62 is the same as the inner diameter of the second tubular member 22. That is, the inside projection 62 is formed in one piece with the stationary core 50 such that an inner wall of the inside projection 62 is joined to the outer wall of the stationary core 50. Furthermore, an outer diameter of the inside projection 62 is smaller than the outer diameter of the third tubular member 23.

The outside projection 72 is formed in one piece with the second tubular member 22 such that the outside projection 72 projects from the end surface 221 of the second tubular member 22, which is located on the third tubular member 23 side, toward the third tubular member 23 and is shaped into a generally cylindrical tubular form, while an end surface 721 of the outside projection 72 is connected to the end surface 231 of the third tubular member 23, which is located on the second tubular member 22 side. Here, an inner diameter of the outside projection 72 is the same as the outer diameter of the inside projection 62. Therefore, an inner wall of the outside projection 72 is engaged with an outer wall of the inside projection 62 through a surface-to-surface contact. Furthermore, an outer diameter of the outside projection 72 is smaller than the outer diameter of the second tubular member 22.

The inside projection 82 is formed in one piece with the first tubular member 21 such that the inside projection 82 projects from the end surface 211 of the first tubular member 21, which is located on the second tubular member 22 side, toward the second tubular member 22 and is shaped into a generally cylindrical tubular form, while an end surface 821 of the inside projection 82 is connected to the end surface 222 of the second tubular member 22, which is located on the first tubular member 21 side. Here, an inner diameter of the inside projection 82 is the same as the inner diameter of the first tubular member 21. Furthermore, an outer diameter of the inside projection 82 is smaller than the outer diameter of the first tubular member 21. Furthermore, in the present embodiment, the outer diameter of the inside projection 82 is the same as the outer diameter of the inside projection 62 and the inner diameter of the outside projection 72.

The outside projection 92 is formed in one piece with the second tubular member 22 such that the outside projection 92 projects from the end surface 222 of the second tubular member 22, which is located on the first tubular member 21 side, toward the first tubular member 21 and is shaped into a generally cylindrical tubular form, while an end surface 921 of the outside projection 92 is connected to the end surface 211 of the first tubular member 21, which is located on the second tubular member 22 side. Here, an inner diameter of the outside projection 92 is the same as the outer diameter of the inside projection 82. Therefore, an inner wall of the outside projection 92 is engaged with an outer wall of the inside projection 82 through a surface-to-surface contact. Furthermore, an outer diameter of the outside projection 92 is smaller than the outer diameter of the second tubular member 22.

The inside projection 63 is formed in one piece with the second tubular member 22 such that the inside projection 63 projects from the end surface 221 of the second tubular member 22, which is located on the third tubular member 23 side, toward the third tubular member 23 and is shaped into a generally cylindrical tubular form, while an end surface 631 of the inside projection 63 is connected to the end surface 231 of the third tubular member 23, which is located on the second tubular member 22 side. Here, an inner diameter of the inside projection 63 is the same as the outer diameter of the outside projection 72. Therefore, the inside projection 63 is formed in one piece with the outside projection 72 such that an inner wall of the inside projection 63 is joined to an outer wall of the outside projection 72. Furthermore, an outer diameter of the inside projection 63 is smaller than the outer diameter of the second tubular member 22.

The outside projection 73 is formed in one piece with the third tubular member 23 such that the outside projection 73 projects from the end surface 231 of the third tubular member 23, which is located on the second tubular member 22 side, toward the second tubular member 22 and is shaped into a generally cylindrical tubular form, while an end surface 731 of the outside projection 73 is connected to the end surface 221 of the second tubular member 22, which is located on the third tubular member 23 side. Here, an inner diameter of the outside projection 73 is the same as the outer diameter of the inside projection 63. Therefore, an inner wall of the outside projection 73 is engaged with an outer wall of the inside projection 63 through a surface-to-surface contact. Furthermore, an outer diameter of the outside projection 73 is the same as the outer diameter of the third tubular member 23.

The inside projection 83 is formed in one piece with the second tubular member 22 such that the inside projection 83 projects from the end surface 222 of the second tubular member 22, which is located on the first tubular member 21 side, toward the first tubular member 21 and is shaped into a generally cylindrical tubular form, while an end surface 831 of the inside projection 83 is connected to the end surface 211 of the first tubular member 21, which is located on the second tubular member 22 side. Here, an inner diameter of the inside projection 83 is the same as the outer diameter of the outside projection 92. Therefore, the inside projection 83 is formed in one piece with the outside projection 92 such that an inner wall of the inside projection 83 is joined to an outer wall of the outside projection 92. Furthermore, an outer diameter of the inside projection 83 is smaller than the outer diameter of the second tubular member 22.

The outside projection 93 is formed in one piece with the first tubular member 21 such that the outside projection 93 projects from the end surface 211 of the first tubular member 21, which is located on the second tubular member 22 side, toward the second tubular member 22 and is shaped into a generally cylindrical tubular form, while an end surface 931 of the outside projection 93 is connected to the end surface 222 of the second tubular member 22, which is located on the first tubular member 21 side. Here, an inner diameter of the outside projection 93 is the same as the outer diameter of the inside projection 83. Therefore, an inner wall of the outside projection 93 is engaged with an outer wall of the inside projection 83 through a surface-to-surface contact. Furthermore, an outer diameter of the outside projection 93 is the same as the outer diameter of the first tubular member 21.

As discussed above, according to the present embodiment, the inside projection 62, the outside projection 72, the inside projection 63 and the outside projection 73 are arranged one after another in the radial direction of the second tubular member 22, i.e., are arranged concentrically such that the outer wall and the inner wall of each adjacent two of the inside projection 62, the outside projection 72, the inside projection 63 and the outside projection 73 are engaged with each other or are joined with each other. Furthermore, the inside projection 82, the outside projection 92, the inside projection 83 and the outside projection 93 are arranged one after another in the radial direction of the second tubular member 22, i.e., are arranged concentrically such that the outer wall and the inner wall of each adjacent two of the inside projection 82, the outside projection 92, the inside projection 83 and the outside projection 93 are engaged with each other or are joined with each other. Therefore, even when the pressure of the fuel in the fuel passage 26 becomes large, radial deformation of the inside projection 62, the outside projection 72, the inside projection 63, the outside projection 73, the inside projection 82, the outside projection 92, the inside projection 83 and the outside projection 93 can be limited.

Therefore, similar to the first embodiment, according to the present embodiment, the high pressure fuel can be injected while limiting the leakage of the fuel from the fuel passage 26 to the outside of the housing 20.

Fifth Embodiment

Figure 6:
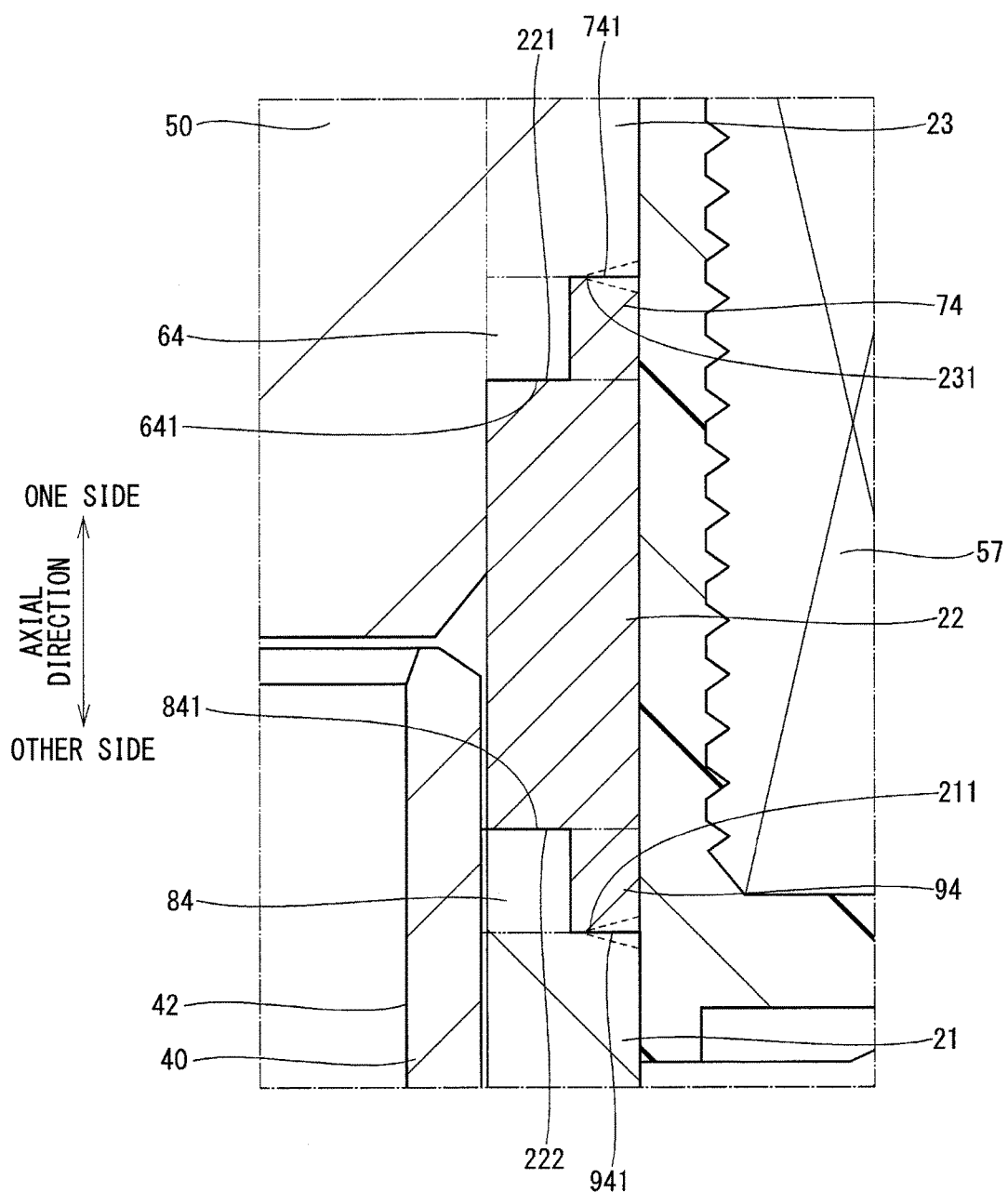
FIG. 6 is a cross-sectional view showing an inside projection and an outside projection of a fuel injection device according to a fifth embodiment of the present disclosure.

FIG. 6 shows a portion of a fuel injection device according to a fifth embodiment of the present disclosure. The fourth embodiment differs from the first embodiment with respect to the arrangement of the inside projections and the outside projections.

In the fifth embodiment, an inside projection 64 is formed in one piece with the third tubular member 23 such that the inside projection 64 projects from the end surface 231 of the third tubular member 23, which is located on the second tubular member 22 side, toward the second tubular member 22 and is shaped into a generally cylindrical tubular form, while an end surface 641 of the inside projection 64 is connected to the end surface 221 of the second tubular member 22, which is located on the third tubular member 23 side. Here, an inner diameter of the inside projection 64 is the same as the inner diameter of the second tubular member 22. That is, the inside projection 64 is formed in one piece with the stationary core 50 such that an inner wall of the inside projection 64 is joined to the outer wall of the stationary core 50. Furthermore, an outer diameter of the inside projection 64 is smaller than the outer diameter of the third tubular member 23.

The outside projection 74 is formed in one piece with the second tubular member 22 such that the outside projection 74 projects from the end surface 221 of the second tubular member 22, which is located on the third tubular member 23 side, toward the third tubular member 23 and is shaped into a generally cylindrical tubular form, while an end surface 741 of the outside projection 74 is connected to the end surface 231 of the third tubular member 23, which is located on the second tubular member 22 side. Here, an inner diameter of the outside projection 74 is the same as the outer diameter of the inside projection 64. Therefore, an inner wall of the outside projection 74 is engaged with an outer wall of the inside projection 64 through a surface-to-surface contact. Furthermore, an outer diameter of the outside projection 74 is the same as the outer diameter of the second tubular member 22.

The inside projection 84 is formed in one piece with the first tubular member 21 such that the inside projection 84 projects from the end surface 211 of the first tubular member 21, which is located on the second tubular member 22 side, toward the second tubular member 22 and is shaped into a generally cylindrical tubular form, while an end surface 841 of the inside projection 84 is connected to the end surface 222 of the second tubular member 22, which is located on the first tubular member 21 side. Here, an inner diameter of the inside projection 84 is the same as the inner diameter of the first tubular member 21. Furthermore, an outer diameter of the inside projection 84 is smaller than the outer diameter of the first tubular member 21. Furthermore, in the present embodiment, the outer diameter of the inside projection 84 is the same as the outer diameter of the inside projection 64 and the inner diameter of the outside projection 74.

The outside projection 94 is formed in one piece with the second tubular member 22 such that the outside projection 94 projects from the end surface 222 of the second tubular member 22, which is located on the first tubular member 21 side, toward the first tubular member 21 and is shaped into a generally cylindrical tubular form, while an end surface 941 of the outside projection 94 is connected to the end surface 211 of the first tubular member 21, which is located on the second tubular member 22 side. Here, an inner diameter of the outside projection 94 is the same as the outer diameter of the inside projection 84. Therefore, an inner wall of the outside projection 94 is engaged with an outer wall of the inside projection 84 through a surface-to-surface contact. Furthermore, an outer diameter of the outside projection 94 is the same as the outer diameter of the second tubular member 22.

In the present embodiment, a connecting portion, at which the third tubular member 23 and the outside projection 74 are connected with each other, is welded along an entire circumferential extent of this connecting portion. Furthermore, a connecting portion, at which the first tubular member 21 and the outside projection 94 are connected with each other, is welded along an entire circumferential extent of this connecting portion.

As discussed above, (1), (2) in the present embodiment, the inside projection 64 is formed in one piece with the third tubular member 23 such that the inside projection 64 projects in the tubular form from the end surface 231 of the third tubular member 23 located on the second tubular member 22 side and is connected to the second tubular member 22.

The outside projection 74 is formed in one piece with the second tubular member 22 such that the outside projection 74 projects in the tubular form from the end surface 221 of the second tubular member 22 located on the third tubular member 23 side and is connected to the third tubular member 23, while the inner wall of the outside projection 74 is engaged with the outer wall of the inside projection 64.

The inside projection 84 is formed in one piece with the first tubular member 21 such that the inside projection 84 projects in the tubular form from the end surface 211 of the first tubular member 21 located on the second tubular member 22 side and is connected to the second tubular member 22.

The outside projection 94 is formed in one piece with the second tubular member 22 such that the outside projection 94 projects in the tubular form from the end surface 222 of the second tubular member 22 located on the first tubular member 21 side and is connected to the first tubular member 21, while the inner wall of the outside projection 94 is engaged with the outer wall of the inside projection 84.

Therefore, similar to the first embodiment, even in the present embodiment, the high pressure fuel can be injected while limiting the leakage of the fuel from the fuel passage 26 to the outside of the housing 20.

Sixth Embodiment

Figure 7:
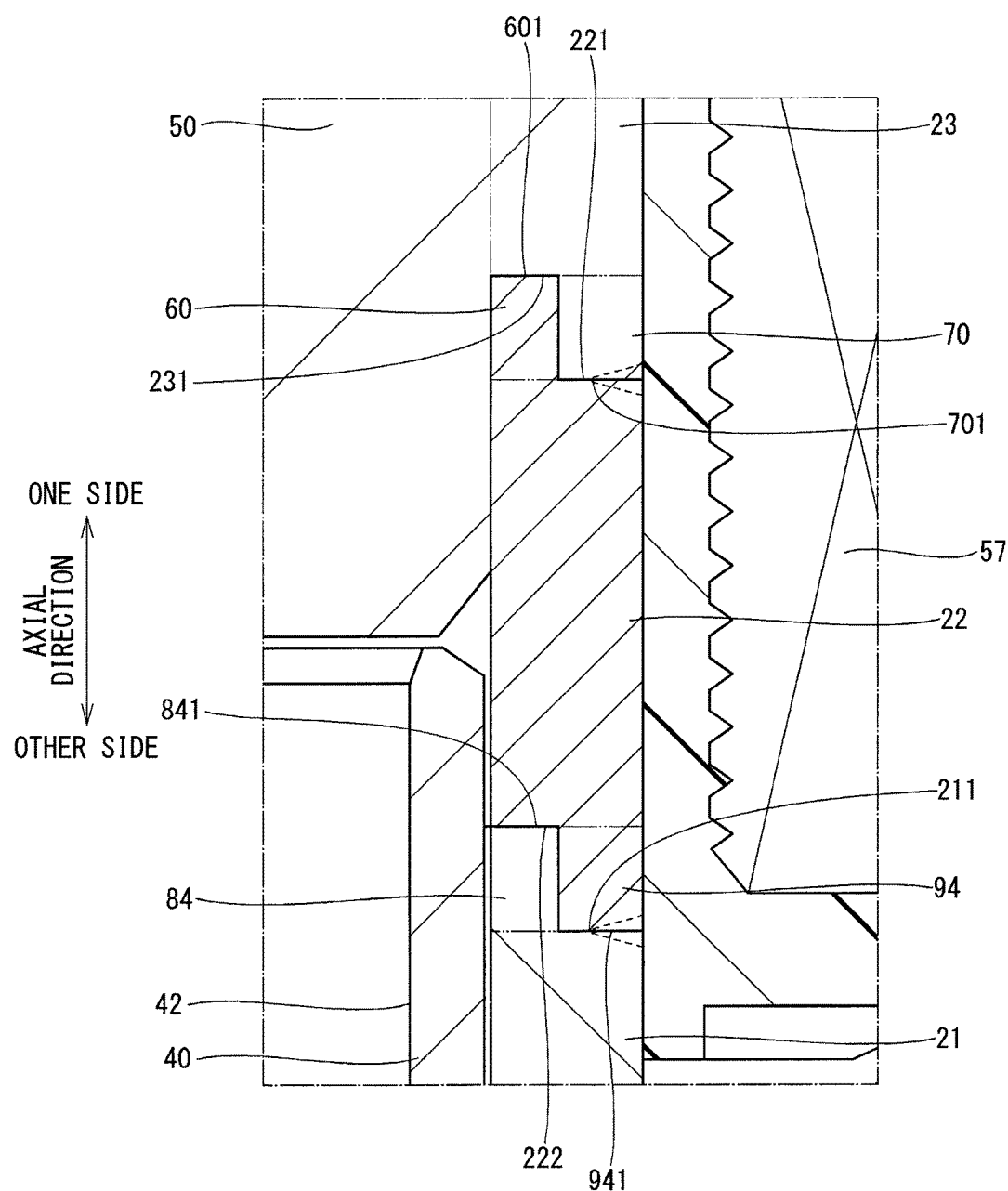
FIG. 7 is a cross-sectional view showing an inside projection and an outside projection of a fuel injection device according to a sixth embodiment of the present disclosure.

FIG. 7 shows a portion of a fuel injection device according to a sixth embodiment of the present disclosure. The sixth embodiment differs from the first embodiment with respect to the arrangement of the inside projections and the outside projections.

The sixth embodiment includes the inside projection 60 and the outside projection 70 discussed in the first embodiment and the inside projection 84 and the outside projection 94 discussed in the fifth embodiment. That is, the sixth embodiment is a combination of the first embodiment and the fifth embodiment.

Therefore, similar to the first embodiment, even in the present embodiment, the high pressure fuel can be injected while limiting the leakage of the fuel from the fuel passage 26 to the outside of the housing 20.

Seventh Embodiment

Figure 8:
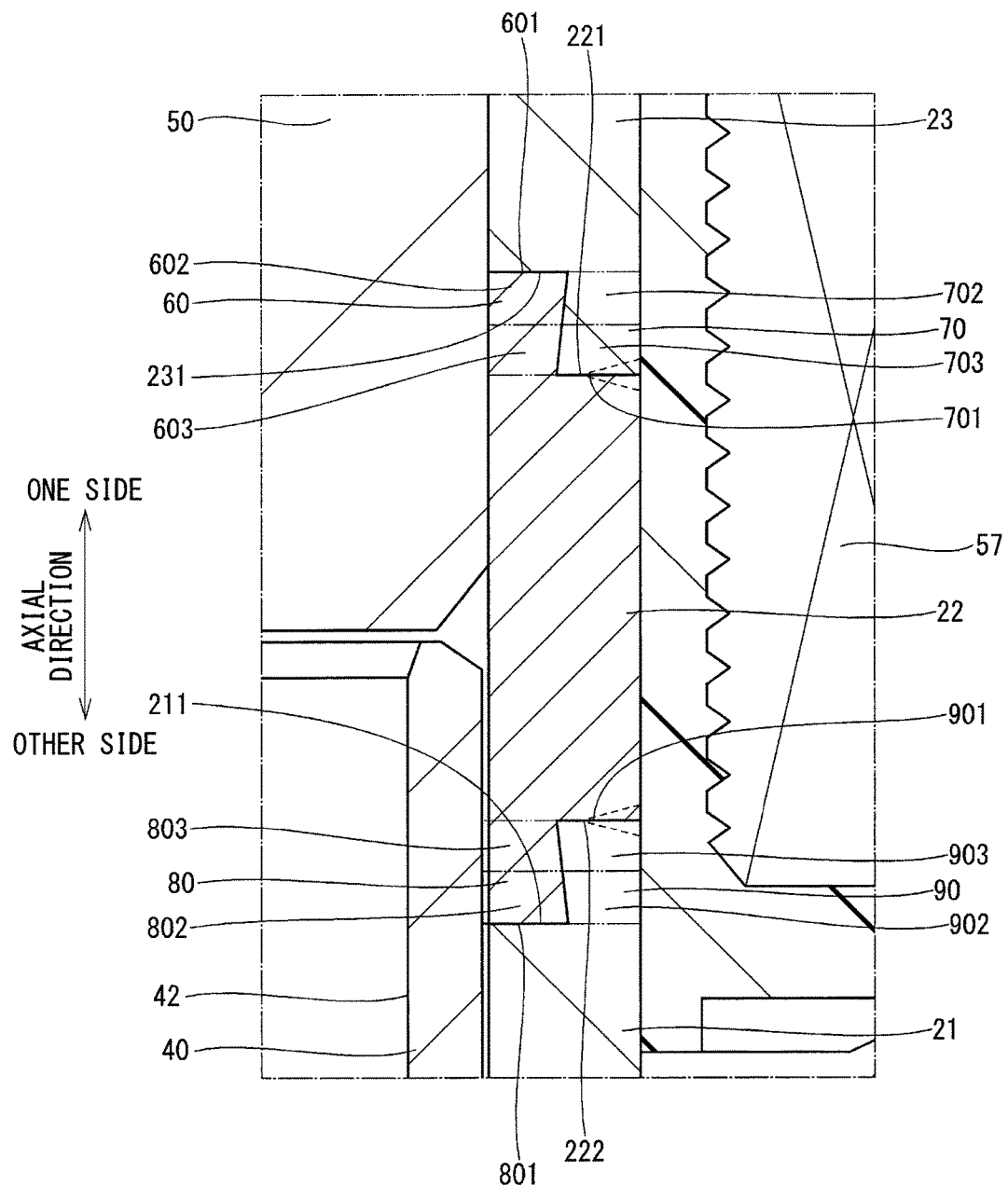
FIG. 8 is a cross-sectional view showing an inside projection and an outside projection of a fuel injection device according to a seventh embodiment of the present disclosure.

FIG. 8 shows a portion of a fuel injection device according to a seventh embodiment of the present disclosure. The seventh embodiment differs from the first embodiment with respect to the shapes of the inside projection 60, the outside projection 70, the inside projection 80 and the outside projection 90.

In the seventh embodiment, the inside projection 60 includes an inside large diameter portion 602 and an inside small diameter portion 603. The inside small diameter portion 603 is formed on the second tubular member 22 side of the inside large diameter portion 602 and has an outer diameter that is smaller than an outer diameter of the inside large diameter portion 602. The inside projection 60 is tapered such that an outer wall of the inside large diameter portion 602 and an outer wall of the inside small diameter portion 603 progressively get closer to the axis of the housing 20 from the one side toward the other side in the axial direction.

The outside projection 70 includes an outside large diameter portion 702 and an outside small diameter portion 703. The outside small diameter portion 703 is formed on the second tubular member 22 side of the outside large diameter portion 702 and has an inner diameter that is smaller than an inner diameter of the outside large diameter portion 702. The outside projection 70 is tapered such that an inner wall of the outside large diameter portion 702 and an inner wall of the outside small diameter portion 703 progressively get closer to the axis of the housing 20 from the one side toward the other side in the axial direction. Therefore, the inner wall of the outside large diameter portion 702 and the inner wall of the outside small diameter portion 703 of the outside projection 70 are engaged with the outer wall of the inside large diameter portion 602 and the outer wall of the inside small diameter portion 603 of the inside projection 60 through a surface-to-surface contact.

The inside projection 80 includes an inside large diameter portion 802 and an inside small diameter portion 803. The inside small diameter portion 803 is formed on the second tubular member 22 side of the inside large diameter portion 802 and has an outer diameter that is smaller than an outer diameter of the inside large diameter portion 802. The inside projection 80 is tapered such that an outer wall of the inside large diameter portion 802 and an outer wall of the inside small diameter portion 803 progressively get closer to the axis of the housing 20 from the other side toward the one side in the axial direction.

The outside projection 90 includes an outside large diameter portion 902 and an outside small diameter portion 903. The outside small diameter portion 903 is formed on the second tubular member 22 side of the outside large diameter portion 902 and has an inner diameter that is smaller than an inner diameter of the outside large diameter portion 902. The outside projection 90 is tapered such that an inner wall of the outside large diameter portion 902 and an inner wall of the outside small diameter portion 903 progressively get closer to the axis of the housing 20 from the other side toward the one side in the axial direction. Therefore, the inner wall of the outside large diameter portion 902 and the inner wall of the outside small diameter portion 903 of the outside projection 90 are engaged with the outer wall of the inside large diameter portion 802 and the outer wall of the inside small diameter portion 803 of the inside projection 80 through a surface-to-surface contact.

The inside large diameter portion 602 of the inside projection 60 and the outside small diameter portion 703 of the outside projection 70 are formed to be overlapped with each other in the axial direction. The inside large diameter portion 802 of the inside projection 80 and the outside small diameter portion 903 of the outside projection 90 are formed to be overlapped with each other in the axial direction.

Furthermore, in the present embodiment, the third tubular member 23 is formed separately from the stationary core 50.

In the present embodiment, at the time of forming the housing 20 by assembling the first tubular member 21, the second tubular member 22 and the third tubular member 23 together, for instance, the second tubular member 22 is cooled along with the inside projection 60 and the inside projection 80 to reduce the outer diameter thereof, and the first tubular member 21 and the third tubular member 23 are heated along with the outside projection 70 and the outside projection 90 to increase the inner diameter thereof. Then, in this state, the first tubular member 21, the second tubular member 22 and the third tubular member 23 are joined one after another. In this way, the first tubular member 21, the second tubular member 22 and the third tubular member 23 are relative easily joined together such that the inside projection 60 is joined to the third tubular member 23, and the outside projection 70 is joined to the second tubular member 22, and the inside projection 80 is joined to the first tubular member 21, and the outside projection 90 is joined to the second tubular member 22. Thereby, the housing 20 is formed. When the temperatures of the first tubular member 21, the second tubular member 22 and the third tubular member 23, which are assembled by the above described method, are returned to the normal temperature, the outer wall of the inside projection 60 and the inner wall of the outside projection 70 are engaged with each other through a surface-to-surface contact, and the outer wall of the inside projection 80 and the inner wall of the outside projection 90 are engaged with each other through a surface-to-surface contact. Thereafter, the stationary core 50 may be inserted into the inside of the third tubular member 23 and the second tubular member 22.

As described above, (4) in the present embodiment, the inside projection 60 is formed such that the outer wall of the inside projection 60 progressively gets closer to the axis of the housing 20 from the one side toward the other side in the axial direction along the entire axial extent of the outer wall of the inside projection 60. The inside projection 80 is formed such that the outer wall of the inside projection 80 progressively gets closer to the axis of the housing 20 from the other side toward the one side in the axial direction along the entire axial extent of the outer wall of the inside projection 80.

The outside projection 70 is formed such that the inner wall of the outside projection 70 progressively gets closer to the axis of the housing 20 from the one side toward the other side in the axial direction along the entire axial extent of the inner wall of the outside projection 70. The outside projection 90 is formed such that the inner wall of the outside projection 90 progressively gets closer to the axis of the housing 20 from the other side toward the one side in the axial direction along the entire axial extent of the inner wall of the outside projection 90.

Furthermore, (5) in the present embodiment, the inside projection 60 includes the inside large diameter portion 602 and the inside small diameter portion 603, and the inside small diameter portion 603 is formed on the second tubular member 22 side of the inside large diameter portion 602 and has the outer diameter that is smaller than the outer diameter of the inside large diameter portion 602. The outside projection 70 includes the outside large diameter portion 702 and the outside small diameter portion 703, and the outside small diameter portion 703 is formed on the second tubular member 22 side of the outside large diameter portion 702 and has the inner diameter that is smaller than the inner diameter of the outside large diameter portion 702. The inside projection 80 includes the inside large diameter portion 802 and the inside small diameter portion 803, and the inside small diameter portion 803 is formed on the second tubular member 22 side of the inside large diameter portion 802 and has the outer diameter that is smaller than the outer diameter of the inside large diameter portion 802. The outside projection 90 includes the outside large diameter portion 902 and the outside small diameter portion 903, and the outside small diameter portion 903 is formed on the second tubular member 22 side of the outside large diameter portion 902 and has the inner diameter that is smaller than the inner diameter of the outside large diameter portion 902.

The inside large diameter portion 602 of the inside projection 60 and the outside small diameter portion 703 of the outside projection 70 are formed to be overlapped with each other in the axial direction. The inside large diameter portion 802 of the inside projection 80 and the outside small diameter portion 903 of the outside projection 90 are formed to be overlapped with each other in the axial direction. Therefore, it is possible to limit separation between the second tubular member 22 and the third tubular member 23 in the axial direction and separation between the second tubular member 22 and the first tubular member 21 in the axial direction. Thus, even when the pressure in the fuel passage 26 is further increased, it is possible to limit leakage of the fuel from the fuel passage 26 to the outside of the housing 20 as well as a damage of the housing 20.

Eighth Embodiment

Figure 9:
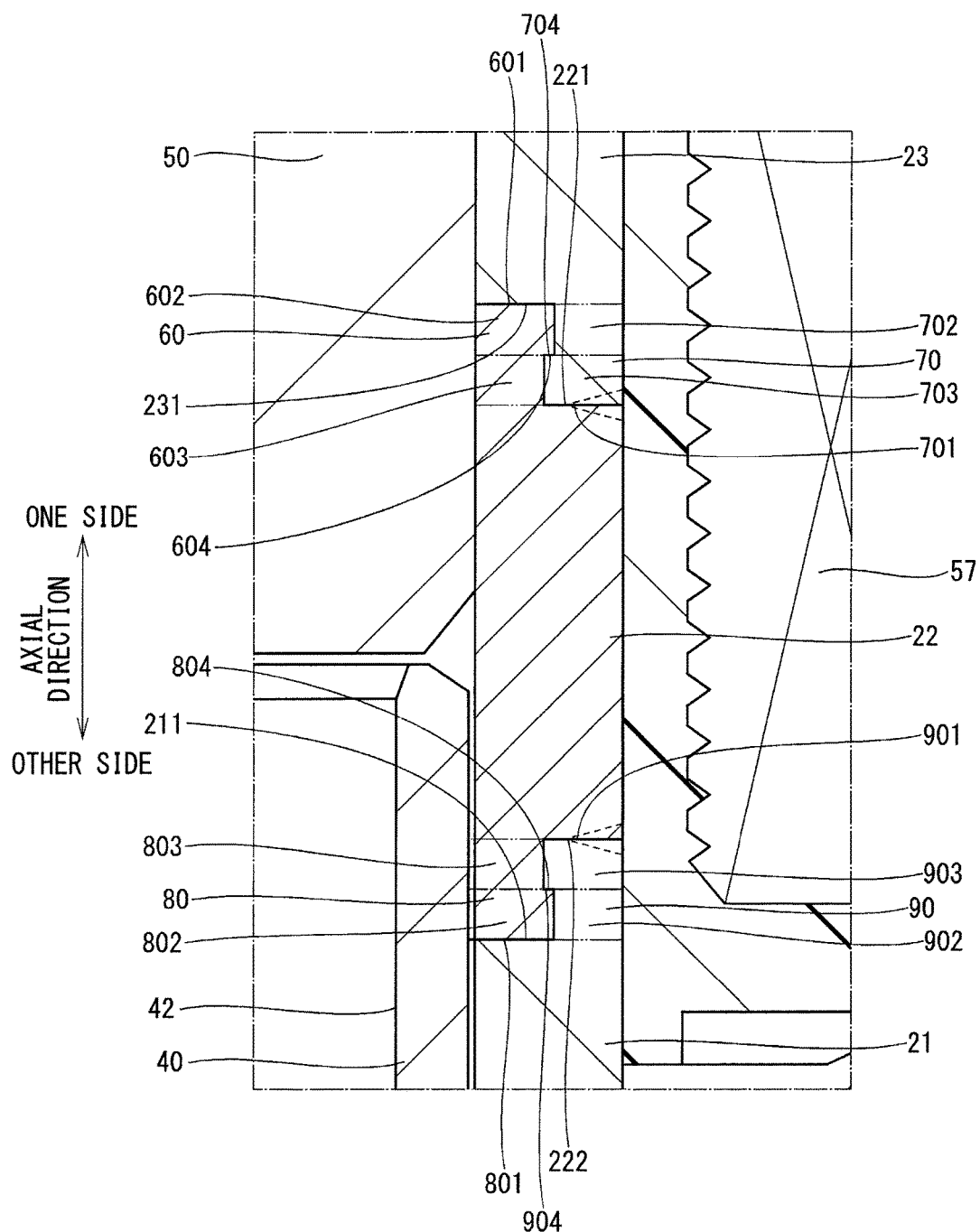
FIG. 9 is a cross-sectional view showing an inside projection and an outside projection of a fuel injection device according to an eighth embodiment of the present disclosure.

FIG. 9 shows a portion of a fuel injection device according to an eighth embodiment of the present disclosure. The eighth embodiment differs from the seventh embodiment with respect to the shapes of the inside projection 60, the outside projection 70, the inside projection 80 and the outside projection 90.

In the eighth embodiment, the outer diameter of the inside large diameter portion 602 and the outer diameter of the inside small diameter portion 603 of the inside projection 60, the inner diameter of the outside large diameter portion 702 and the inner diameter of the outside small diameter portion 703 of the outside projection 70, the outer diameter of the inside large diameter portion 802 and the outer diameter of the inside small diameter portion 803 of the inside projection 80, and the inner diameter of the outside large diameter portion 902 and the inner diameter of the outside small diameter portion 903 of the outside projection 90 are constant in the axial direction. Therefore, an inside engaging surface 604 is formed between the inside large diameter portion 602 and the inside small diameter portion 603 of the inside projection 60 such that the inside engaging surface 604 extends in a ring form at a radially outer side of the inside projection 60. Furthermore, an outside engaging surface 704 is formed between the outside large diameter portion 702 and the outside small diameter portion 703 of the outside projection 70 such that the outside engaging surface 704 extends in a ring form at a radially inner side of the outside projection 70. Here, the outside engaging surface 704 is engageable with the inside engaging surface 604. Therefore, the inside engaging surface 604 and the outside engaging surface 704 can be anchored to each other. In this way, relative movement between the second tubular member 22 and the third tubular member 23 in the axial direction is limited.

Furthermore, an inside engaging surface 804 is formed between the inside large diameter portion 802 and the inside small diameter portion 803 of the inside projection 80 such that the inside engaging surface 804 extends in a ring form at a radially outer side of the inside projection 80. Furthermore, an outside engaging surface 904 is formed between the outside large diameter portion 902 and the outside small diameter portion 903 of the outside projection 90 such that the outside engaging surface 904 extends in a ring form at a radially inner side of the outside projection 90. Here, the outside engaging surface 904 is engageable with the inside engaging surface 804. Therefore, the inside engaging surface 804 and the outside engaging surface 904 can be anchored to each other. In this way, relative movement between the second tubular member 22 and the first tubular member 21 in the axial direction is limited.

At the time of forming the housing 20 by assembling the first tubular member 21, the second tubular member 22 and the third tubular member 23 together, a method, which is similar to the method discussed in the seventh embodiment, may be used.

As discussed above, (7) in the present embodiment, the inside projection 60 includes the inside engaging surface 604, and the outside projection 70 include the outside engaging surface 704, which is engageable with the inside engaging surface 604. Furthermore, the inside projection 80 includes the inside engaging surface 804, and the outside projection 90 includes the outside engaging surface 904, which can be anchored to the inside engaging surface 804. Therefore, it is possible to reliably limit the separation between the second tubular member 22 and the third tubular member 23 in the axial direction and the separation between the second tubular member 22 and the first tubular member 21 in the axial direction. Thus, even when the pressure in the fuel passage 26 is further increased, it is possible to effectively limit leakage of the fuel from the fuel passage 26 to the outside of the housing 20 as well as the damage of the housing 20.

Ninth Embodiment

Figure 10:
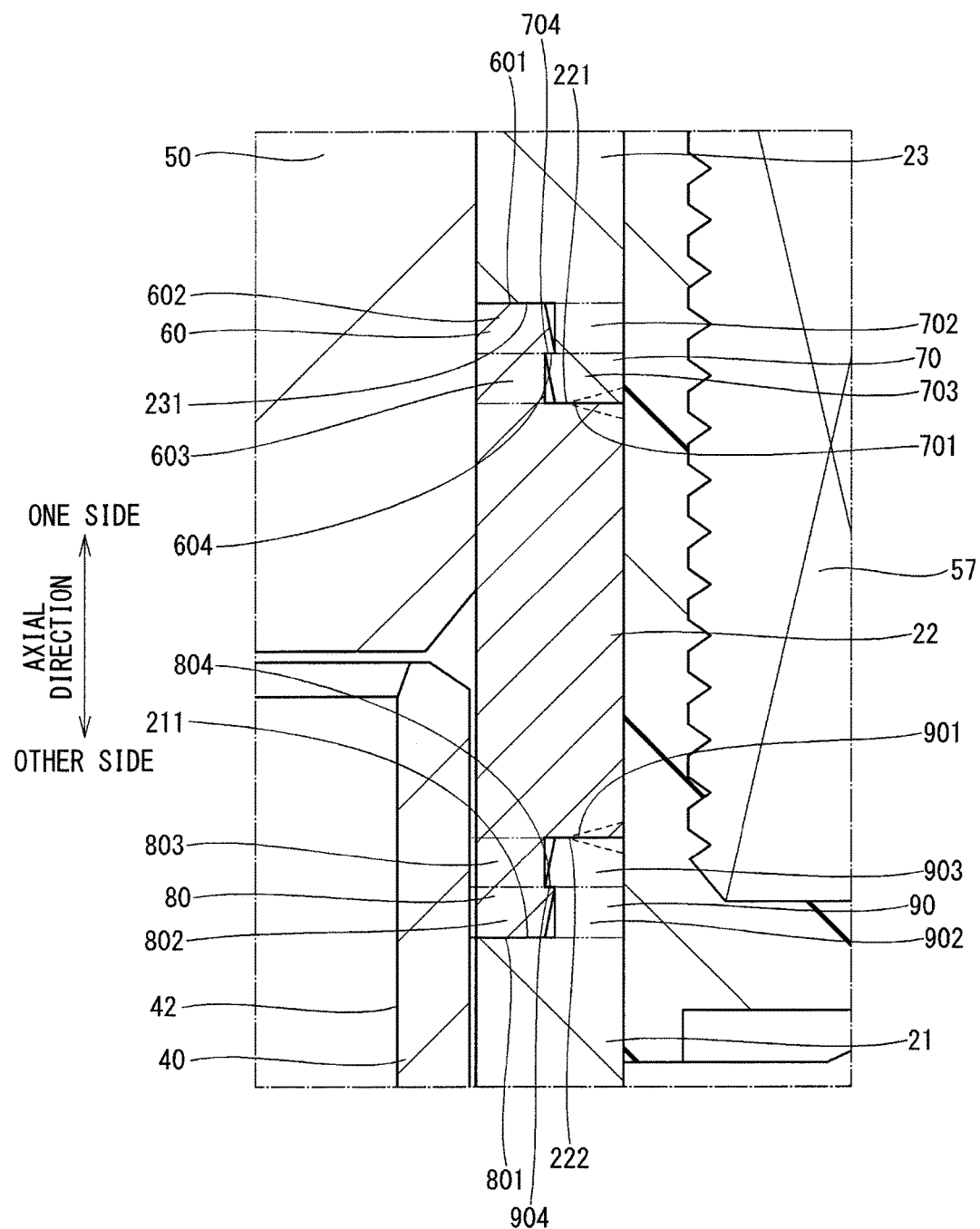
FIG. 10 is a cross-sectional view showing an inside projection and an outside projection of a fuel injection device according to a ninth embodiment of the present disclosure.

FIG. 10 shows a portion of a fuel injection device according to a ninth embodiment of the present disclosure. The ninth embodiment differs from the eighth embodiment with respect to the shapes of the inside projection 60, the outside projection 70, the inside projection 80 and the outside projection 90.

In the ninth embodiment, the inside projection 60 is tapered such that an outer wall of the inside large diameter portion 602 progressively gets closer to the axis of the housing 20 from the other side toward the one side in the axial direction. The outside projection 70 is tapered such that an inner wall of the outside small diameter portion 703 progressively gets closer to the axis of the housing 20 from the other side toward the one side in the axial direction. Therefore, at the time of assembling the second tubular member 22 and the third tubular member 23 together, when the second tubular member 22 and the third tubular member 23 are moved toward each other in the axial direction, the inside projection 60 and the outside projection 70 are resiliently deformed in the radial direction while the outer wall of the inside large diameter portion 602 of the inside projection 60 and the inner wall of the outside small diameter portion 703 of the outside projection 70 are slid relative to each other. When the end surface 601 of the inside projection 60 is engaged with the end surface 231 of the third tubular member 23, the inside engaging surface 604 and the outside engaging surface 704 are engaged with each other (see FIG. 10).

Furthermore, the inside projection 80 is tapered such that an outer wall of the inside large diameter portion 802 of the inside projection 80 progressively gets closer to the axis of the housing 20 from the one side toward the other side in the axial direction. The outside projection 90 is tapered such that an inner wall of the outside small diameter portion 903 progressively gets closer to the axis of the housing 20 from the one side toward the other side in the axial direction. Therefore, at the time of assembling the second tubular member 22 and the first tubular member 21 together, when the second tubular member 22 and the first tubular member 21 are moved toward each other in the axial direction, the inside projection 80 and the outside projection 90 are resiliently deformed in the radial direction while the outer wall of the inside large diameter portion 802 of the inside projection 80 and the inner wall of the outside small diameter portion 903 of the outside projection 90 are slid relative to each other. When the end surface 801 of the inside projection 80 is engaged with the end surface 211 of the first tubular member 21, the inside engaging surface 804 and the outside engaging surface 904 are engaged with each other (see FIG. 10).

As discussed above, (7) in the present embodiment, the inside projection 60 includes the inside engaging surface 604, and the outside projection 70 includes the outside engaging surface 704, and the inside projection 80 includes the inside engaging surface 804, and the outside projection 90 includes the outside engaging surface 904. Therefore, similar to the eighth embodiment, it is possible to reliably limit the separation between the second tubular member 22 and the third tubular member 23 in the axial direction and the separation between the second tubular member 22 and the first tubular member 21 in the axial direction.

Furthermore, in the present embodiment, the outer wall of the inside large diameter portion 602 of the inside projection 60, the inner wall of the outside small diameter portion 703 of the outside projection 70, the outer wall of the inside large diameter portion 802 of the inside projection 80, the inner wall of the outside small diameter portion 903 of the outside projection 90 are tapered. Therefore, at the time of forming the housing 20 by assembling the first tubular member 21, the second tubular member 22 and the third tubular member 23 together, it is not required to cool or heat the first tubular member 21, the second tubular member 22 and the third tubular member 23 unlike in the seventh and eighth embodiments.

Tenth Embodiment

Figure 11:
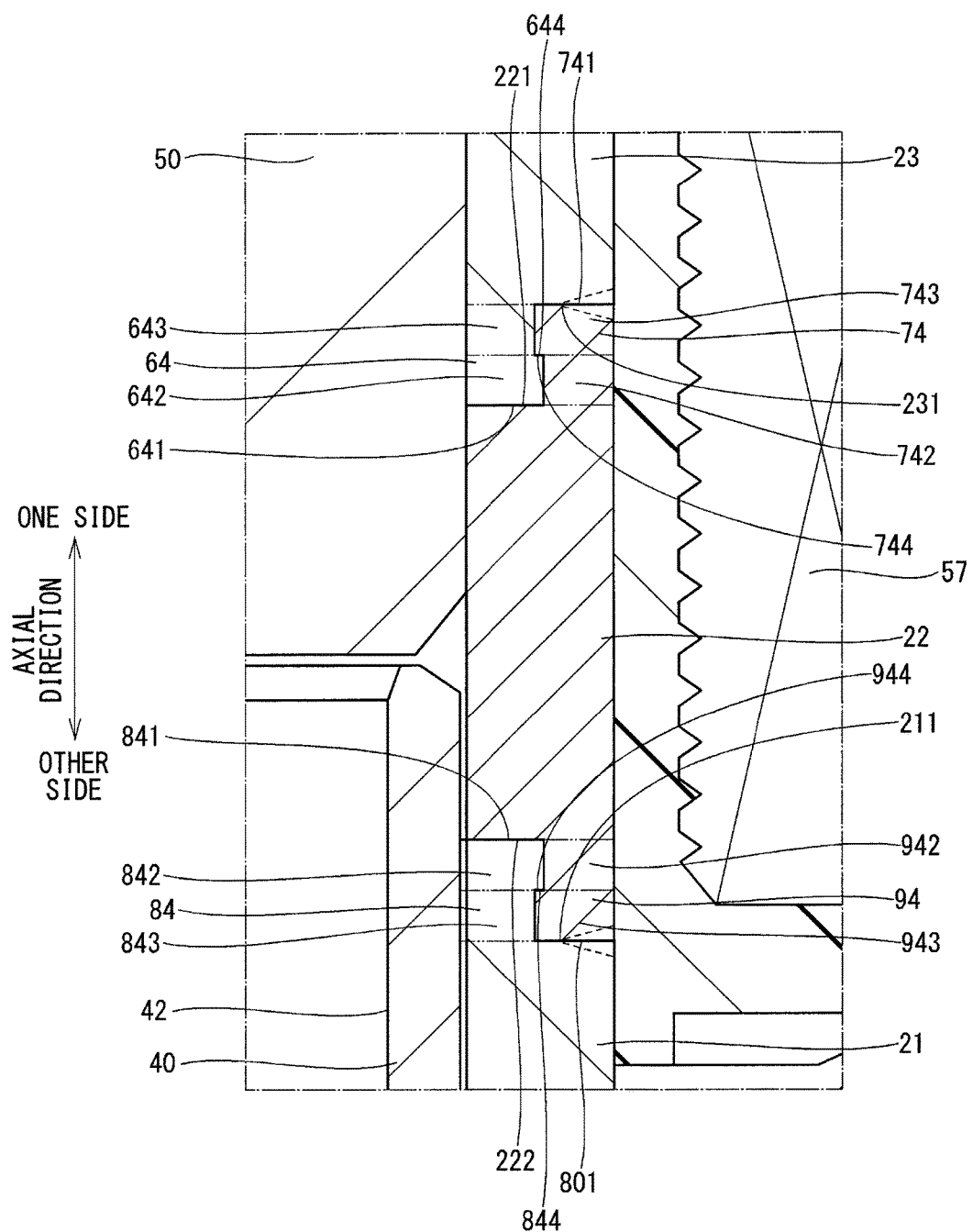
FIG. 11 is a cross-sectional view showing an inside projection and an outside projection of a fuel injection device according to a tenth embodiment of the present disclosure.

FIG. 11 shows a portion of a fuel injection device according to a tenth embodiment of the present disclosure. The tenth embodiment differs from the fifth embodiment with respect to the shapes of the inside projection 60, the outside projection 70, the inside projection 80 and the outside projection 90.

In the tenth embodiment, the inside projection 64 includes an inside small diameter portion 643 and an inside large diameter portion 642. The inside large diameter portion 642 is formed on the second tubular member 22 side of the inside small diameter portion 643 and has an outer diameter that is larger than an outer diameter of the inside small diameter portion 643. The outside projection 74 includes an outside small diameter portion 743 and an outside large diameter portion 742. The outside large diameter portion 742 is formed on the second tubular member 22 side of the outside small diameter portion 743 and has an inner diameter that is larger than an inner diameter of the outside small diameter portion 743.

Furthermore, an inside engaging surface 644 is formed between the inside large diameter portion 642 and the inside small diameter portion 643 of the inside projection 64 such that the inside engaging surface 644 extends in a ring form at a radially outer side of the inside projection 64. Furthermore, an outside engaging surface 704 is formed between the outside large diameter portion 742 and the outside small diameter portion 743 of the outside projection 74 such that the outside engaging surface 704 extends in a ring form at a radially inner side of the outside projection 74. Here, the outside engaging surface 704 is engageable with the inside engaging surface 604.

The inside projection 84 includes an inside small diameter portion 843 and an inside large diameter portion 842. The inside large diameter portion 842 is formed on the second tubular member 22 side of the inside small diameter portion 843 and has an outer diameter that is larger than an outer diameter of the inside small diameter portion 843. The outside projection 94 includes an outside small diameter portion 943 and an outside large diameter portion 942. The outside large diameter portion 942 is formed on the second tubular member 22 side of the outside small diameter portion 943 and has an inner diameter that is larger than an inner diameter of the outside small diameter portion 943.

An inside engaging surface 844 is formed between the inside large diameter portion 842 and the inside small diameter portion 843 of the inside projection 84 such that the inside engaging surface 844 extends in a ring form at a radially outer side of the inside projection 84. Furthermore, an outside engaging surface 944 is formed between the outside large diameter portion 942 and the outside small diameter portion 943 of the outside projection 94 such that the outside engaging surface 944 extends in a ring form at a radially inner side of the outside projection 94. Here, the outside engaging surface 944 is engageable with the inside engaging surface 844.

At the time of forming the housing 20 by assembling the first tubular member 21, the second tubular member 22 and the third tubular member 23 together, a method, which is similar to the method discussed in the seventh embodiment, may be used.

As discussed above, (7) in the present embodiment, the inside projection 64 includes the inside engaging surface 644, and the outside projection 74 include the outside engaging surface 744, which is engageable with the inside engaging surface 644. Furthermore, the inside projection 84 includes the inside engaging surface 844, and the outside projection 94 includes the outside engaging surface 944, which can be engaged with the inside engaging surface 844. Therefore, it is possible to reliably limit the separation between the second tubular member 22 and the third tubular member 23 in the axial direction and the separation between the second tubular member 22 and the first tubular member 21 in the axial direction. Thus, even when the pressure in the fuel passage 26 is further increased, it is possible to effectively limit leakage of the fuel from the fuel passage 26 to the outside of the housing 20 as well as the damage of the housing 20.

Other Embodiments

In the above embodiments, the inside projections and the outside projections are formed at the third tubular member 23 side of the second tubular member 22 and the first tubular member 21 side of the second tubular member 22. Alternatively, in another embodiment of the present disclosure, the inside projection(s) and the outside projection(s) may be formed at only one of the third tubular member 23 side of the second tubular member 22 and the first tubular member 21 side of the second tubular member 22.

In the above embodiments, the various forms of the inside projections and the outside projections are described. In another embodiment of the present disclosure, as long as there is no interfering factor, the inside projections and the outside projections of the above embodiments may be combined in any combination(s).

Furthermore, in the above embodiments, the gap forming member, which can form the gap, is provided between the flange portion of the needle and the movable core, and the movable core is accelerated through this gap and collides against the flange portion. In another embodiment of the present disclosure, the gap forming member may be eliminated. In such a case, it is possible to conceive a structure of that the end part of the valve seat side urging member (the spring 52) is engaged with the needle (the flange portion), and the valve seat side urging member urges the needle toward the valve seat.

Furthermore, in the above embodiments, there is discussed the example where the movable core is constructed to be displaceable relative to the needle. Alternatively, in another embodiment of the present disclosure, the movable core may be constructed such that the movable core is not displaceable relative to the needle. Furthermore, the movable core may be formed integrally with the needle such that the movable core is not displaceable relative to the needle.

The application of the present disclosure should not be limited to the direct injection type gasoline engine, and the present disclosure may be applied to a port injection type gasoline engine or a diesel engine.

As discussed above, the present disclosure should not be limited to the above embodiments, and the present disclosure may be embodied in various other forms without departing from the scope of the present disclosure.

The invention claimed is:

1. A fuel injection device comprising:
   a nozzle that includes:
      a nozzle tube portion that is shaped into a tubular form;
      a nozzle bottom portion that closes one end of the nozzle tube portion;
      an injection hole that connects between a surface of the nozzle bottom portion, which is located on the nozzle tube portion side, and an opposite surface of the nozzle bottom portion, which is opposite from the nozzle tube portion, wherein the injection hole injects fuel; and
      a valve seat that is formed into a ring form around the injection hole on the nozzle tube portion side of the nozzle bottom portion;
   a housing that includes:
      a first tubular member that is made of a magnetic metal material and is placed such that one end of the first tubular member-is connected to an opposite side of the nozzle tube portion, which is opposite from the nozzle bottom portion;
      a second tubular member that is made of a non-magnetic metal material is placed such that one end of the second tubular member is placed at a side where another end of the first tubular member is located;
      a third tubular member that is made of a magnetic metal material and is placed such that one end of the third tubular member is placed at a side where another end of the second tubular member is located; and
      a fuel passage that is formed in an inside of the first tubular member, the second tubular member and the third tubular member to conduct the fuel to the injection hole;
   a needle that is reciprocatable in an inside of the fuel passage, wherein when one end of the needle is lifted away from or is seated against the valve seat, the needle opens or closes the injection hole;

an inside projection that is formed in one piece with one of the second tubular member and the third tubular member such that the inside projection projects in a tubular form from an end surface of the one of the second tubular member and the third tubular member toward another one of the second tubular member and the third tubular member and is connected to the another one of the second tubular member and the third tubular member;

an outside projection that is formed in one piece with the another one of the second tubular member and the third tubular member such that the outside projection projects in a tubular form from an end surface of the another one of the second tubular member and the third tubular member toward the one of the second tubular member and the third tubular member and is connected to the one of the second tubular member and the third tubular member while an inner wall of the outside projection contacts an outer wall of the inside projection;

an end surface of the outside projection contacts the end surface of the one of the second tubular member and the third tubular member;

an end surface of the inside projection and the end surface of the outside projection are displaced from each other in an axial direction;

the end surface of the outside projection is welded to the end surface of the one of the second tubular member and the third tubular member to form a welded portion; and a length of the welded portion, which joins between the end surface of the outside projection and the end surface of the one of the second tubular member and the third tubular member, is at least equal to a length of the end surface of the outside projection.

2. The fuel injection device according to claim 1, wherein:
the inside projection is formed in one piece with the second tubular member; and
an edge of an inner side of one end part of the inside projection, which is located on the third tubular member side, or another end part of the inside projection, which is located on the first tubular member side, is chamfered.

3. The fuel injection device according to claim 1, wherein:
the inside projection is formed such that at least a portion of the outer wall of the inside projection, which is located along the outer wall of the inside projection in an axial direction, progressively approaches a central axis of the housing from one side toward another side in the axial direction or from the another side toward the one side in the axial direction; and
the outside projection is formed such that at least a portion of the inner wall of the outside projection, which is located along the inner wall of the inside projection in the axial direction, progressively approaches the central axis of the housing from the one side toward the another side in the axial direction or from the another side toward the one side in the axial direction.

4. The fuel injection device according to claim 1, wherein:
the inside projection includes:
an inside large diameter portion; and
an inside small diameter portion that is formed on the second tubular member side of the inside large diameter portion, wherein the inside small diameter portion has an outer diameter, which is smaller than an outer diameter of the inside large diameter portion;

the outside projection includes:
an outside large diameter portion; and
an outside small diameter portion that is formed on the second tubular member side of the outside large diameter portion, wherein the outside small diameter portion has an inner diameter, which is smaller than an inner diameter of the outside large diameter portion; and the inside large diameter portion and the outside small diameter portion are formed to overlap with each other in the axial direction.

5. The fuel injection device according to claim 4, wherein:
the inside projection includes an inside engaging surface that is formed between the inside large diameter portion and the inside small diameter portion such that the inside engaging surface extends in a ring form at a radially outer side of the inside projection; and
the outside projection includes an outside engaging surface that is formed between the outside large diameter portion and the outside small diameter portion such that the outside projection extends in a ring form at a radially inner side of the outside projection, wherein the outside engaging surface is engaged to the inside engaging surface.

6. The fuel injection device according to claim 1, wherein:
the inside projection includes:
an inside small diameter portion; and
an inside large diameter portion that is formed on the second tubular member side of the inside small diameter portion, wherein the inside large diameter portion has an outer diameter, which is larger than an outer diameter of the inside small diameter portion;
the outside projection includes:
an outside small diameter portion; and
an outside large diameter portion that is formed on the second tubular member side of the outside small diameter portion, wherein the outside large diameter portion has an inner diameter, which is larger than an inner diameter of the outside small diameter portion; and
the inside large diameter portion and the outside small diameter portion are formed to overlap with each other in the axial direction.

7. The fuel injection device according to claim 1, further comprising:
a movable core that is installed such that the movable core is reciprocatable along with the needle in the inside of the fuel passage;
a stationary core that is installed on an opposite side of the movable core, which is opposite from the valve seat, in an inside of the housing;
a coil that is placed at an outside of the housing, wherein the coil is capable of attracting the movable core toward the stationary core side to move the needle toward an opposite side, which is opposite from the valve seat, when the coil is energized; and
a valve seat side urging member that is capable of urging the needle and the movable core toward the valve seat side.

8. The fuel injection device according to claim 7, wherein the third tubular member is formed in one piece with the stationary core such that an inner wall of the third tubular member is connected to an outer wall of the stationary core.

9. The fuel injection device according to claim 1, wherein:
the needle includes a contact surface that is contactable with a surface of the movable core located on the stationary core side; and the movable core is movable relative to the needle to enable contacting of the movable core to the contact surface and lifting of the movable core from the contact surface.

10. The fuel injection device according to claim 9, further comprising a gap forming member that is capable of forming a gap between the contact surface and the movable core.

11. The fuel injection device according to claim 1, wherein:
the inside projection is a primary inside projection;
the outside projection is a primary outside projection; and
the fuel injection device further comprises:
a secondary inside projection that is formed in one piece with one of the first tubular member and the second tubular member such that the secondary inside projection projects in a tubular form from an end surface of the one of the first tubular member and the second tubular member toward another one of the first tubular member and the second tubular member and is connected to the another one of the first tubular member and the second tubular member;
a secondary outside projection that is formed in one piece with the another one of the first tubular member and the second tubular member such that the secondary outside projection projects in a tubular form from an end surface of the another one of the first tubular member and the second tubular member toward the one of the first tubular member and the second tubular member and is connected to the one of the first tubular member and the second tubular member while an inner wall of the secondary outside projection contacts an outer wall of the secondary inside projection;
an end surface of the secondary outside projection contacts the end surface of the one of the first tubular member and the second tubular member;
an end surface of the secondary inside projection and the end surface of the secondary outside projection are displaced from each other in the axial direction;
the end surface of the secondary outside projection is welded to the end surface of the one of the first tubular member and the second tubular member to form a welded portion; and
a length of the welded portion, which joins between the end surface of the secondary outside projection and the end surface of the one of the first tubular member and the second tubular member, is at least equal to a length of the end surface of the secondary outside projection.

12. A fuel injection device comprising:
a nozzle that includes:
a nozzle tube portion that is shaped into a tubular form;
a nozzle bottom portion that closes one end of the nozzle tube portion;
an injection hole that connects between a surface of the nozzle bottom portion, which is located on the nozzle tube portion side, and an opposite surface of the nozzle bottom portion, which is opposite from the nozzle tube portion, wherein the injection hole injects fuel; and
a valve seat that is formed into a ring form around the injection hole on the nozzle tube portion side of the nozzle bottom portion;
a housing that includes:
a first tubular member that is made of a magnetic metal material and is placed such that one end of the first tubular member-is connected to an opposite side of the nozzle tube portion, which is opposite from the nozzle bottom portion;
a second tubular member that is made of a non-magnetic metal material and is placed such that one end of the second tubular member is placed at a side where another end of the first tubular member is located;
a third tubular member that is made of a magnetic metal material and is placed such that one end of the third tubular member is placed at a side where another end of the second tubular member is located; and
a fuel passage that is formed in an inside of the first tubular member, the second tubular member and the third tubular member to conduct the fuel to the injection hole;
a needle that is reciprocatable in an inside of the fuel passage, wherein when one end of the needle is lifted away from or is seated against the valve seat, the needle opens or closes the injection hole;
an inside projection that is formed in one piece with one of the first tubular member and the second tubular member such that the inside projection projects in a tubular form from an end surface of the one of the first tubular member and the second tubular member toward another one of the first tubular member and the second tubular member and is connected to the another one of the first tubular member and the second tubular member;
an outside projection that is formed in one piece with the another one of the first tubular member and the second tubular member such that the outside projection projects in a tubular form from an end surface of the another one of the first tubular member and the second tubular member toward the one of the first tubular member and the second tubular member and is connected to the one of the first tubular member and the second tubular member while an inner wall of the outside projection contacts an outer wall of the inside projection;
an end surface of the outside projection contacts the end surface of the one of the first tubular member and the second tubular member;
an end surface of the inside projection and the end surface of the outside projection are displaced from each other in an axial direction;
the end surface of the outside projection is welded to the end surface of the one of the first tubular member and the second tubular member to form a welded portion; and
a length of the welded portion, which joins between the end surface of the outside projection and the end surface of the one of the first tubular member and the second tubular member, is at least equal to a length of the end surface of the outside projection.

* * * * *